(12) United States Patent
Hirakata

(10) Patent No.: US 12,244,251 B2
(45) Date of Patent: Mar. 4, 2025

(54) MOTOR DRIVE DEVICE, MOTOR DRIVING METHOD, AND NON-TRANSITORY COMPUTER READABLE MEDIUM

(71) Applicant: FUJI ELECTRIC CO., LTD., Kawasaki (JP)

(72) Inventor: Masaki Hirakata, Hino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 131 days.

(21) Appl. No.: 18/158,428

(22) Filed: Jan. 23, 2023

(65) Prior Publication Data

US 2023/0353076 A1 Nov. 2, 2023

(30) Foreign Application Priority Data

Mar. 30, 2022 (JP) ................. 2022-054951

(51) Int. Cl.
*H02P 21/22* (2016.01)
*H02P 5/50* (2016.01)

(52) U.S. Cl.
CPC ........... *H02P 21/22* (2016.02); *H02P 5/50* (2013.01)

(58) Field of Classification Search
CPC ............ H02P 21/22; H02P 5/50; H02P 21/24
USPC .................................. 318/400.02
See application file for complete search history.

(56) References Cited

U.S. PATENT DOCUMENTS

| 7,164,253 B2 * | 1/2007 | Sato ............... H02M 7/48 318/105 |
| 2004/0165868 A1 | 8/2004 | Sato |

FOREIGN PATENT DOCUMENTS

| CN | 118269915 A | * | 7/2024 | |
| JP | 2008022645 A | | 1/2008 | |
| JP | 2018191475 A | | 11/2018 | |
| JP | 2019062623 A | * | 4/2019 | ........... H02P 5/46 |
| WO | 03015254 A1 | | 2/2003 | |

OTHER PUBLICATIONS

Office Action issued for counterpart Japanese Application No. 2022-054951, issued by the Japanese Patent Office on May 17, 2022 (drafted on May 10, 2022).

* cited by examiner

*Primary Examiner* — Kawing Chan

(57) ABSTRACT

A motor drive device is provided which includes: a first drive unit configured to drive a plurality of first motor phases; a second drive unit configured to drive a plurality of second motor phases; a common sensor configured to detect a total current flowing through a phase pair obtained by selecting one phase from the plurality of first motor phases and one phase from the plurality of second motor phases; at least one first motor phase sensor and at least one second motor phase sensor configured to detect each current flowing through each phase not included in the phase pair among the plurality of first motor phases and the plurality of second motor phases, respectively; and a drive control unit configured to control drive amounts of the first drive unit and the second drive unit for the plurality of first motor phases and the plurality of second motor phases.

10 Claims, 13 Drawing Sheets

MOTOR DRIVE DEVICE, MOTOR DRIVING METHOD, AND NON-TRANSITORY COMPUTER READABLE MEDIUM

The contents of the following Japanese patent application(s) are incorporated herein by reference:
NO. 2022-054951 filed in JP on Mar. 30, 2022

BACKGROUND

1. Technical Field

The present invention relates to a motor drive device, a motor driving method, and a non-transitory computer readable medium.

2. Related Art

Patent Document 1 describes that "The current sensors 30u, 30v, and 30w that detect three-phase currents (U-phase, V-phase, W-phase) supplied from the inverter 14 to the brushless DC motor 10 are provided between the inverter 14 and the brushless DC motor 10" (paragraph 0012), "The current sensor failure diagnosis unit 23 time-averages a current value of each of the U, V, and W phases for one cycle, for example, and determines whether the current sensor has a failure on the basis of whether the average value is 0. Note that the abnormality may be determined when the signal from the current sensor 30 is opened or short-circuited. Alternatively, another sensor or the like that detects the abnormality of the current sensor 30 may be used" (paragraph 0019), and "On the other hand, when the abnormality of the current sensor 30u is detected by the current sensor failure diagnosis unit 23, an alarm is first notified (step S5). Further, the control is switched to the inverter control using the detection values iv and iw of the current sensors 30v and 30w and the estimated current value iua obtained from the detection values iv and iw (step S6) "(paragraph 0023).

Patent Document 2 discloses that "In this example, two inverters and two motors are provided. In addition to the inverter 14, an inverter 16 is provided between the power supply line and the ground, and the motor M2 is connected to the inverter 16. The configuration of the inverter 16 is the same as that of the inverter 14, and the coil end of each phase of the motor M2 is connected to the midpoint of the arm of each phase of the inverter 16. In addition, the motor current of each phase of the motor 16 is also detected by the current sensor 28 and supplied to the control device 30" (page 10, lines 23 to 29).

CITATION LIST

Patent Document

Patent Document 1: Japanese Patent Application Publication No. 2008-022645
Patent Document 2: International Publication No. 2003-015254

In Patent Documents 1 and 2, it is necessary to provide a current sensor in each phase of the motor. When a plurality of motors is used as in Patent Document 2, it is necessary to provide a current sensor in each phase of each of the plurality of motors.

SUMMARY

A first aspect of the present invention provides a motor drive device. The motor drive device may include a first drive unit configured to drive a plurality of first motor phases included in a first motor. The motor drive device may include a second drive unit configured to drive a plurality of second motor phases included in a second motor. The motor drive device may include a common sensor configured to detect a total current flowing through a phase pair obtained by selecting one phase from the plurality of first motor phases and one phase from the plurality of second motor phases. The motor drive device may include at least one first motor phase sensor configured to detect each current flowing through each phase not included in the phase pair among the plurality of first motor phases. The motor drive device may include at least one second motor phase sensor configured to detect each current flowing through each phase not included in the phase pair among the plurality of second motor phases. The motor drive device may include a drive control unit configured to control drive amounts of the first drive unit and the second drive unit for the plurality of first motor phases and the plurality of second motor phases by using respective current detection values of the common sensor, the at least one first motor phase sensor, and the at least one second motor phase sensor.

In response to detection of a failure in one sensor of the at least one first motor phase sensor and the at least one second motor phase sensor, the drive control unit may be configured to control the drive amounts of the first drive unit and the second drive unit for the plurality of first motor phases and the plurality of second motor phases by using a result obtained when a current detection value of the one sensor in which the failure is detected is estimated by using a current detection value of another sensor among the common sensor, the at least one first motor phase sensor, and the at least one second motor phase sensor.

The drive control unit may include a failure detection unit configured to detect a failure of any sensor in response to a total current amount of flowing into the first motor and the second motor being outside a predetermined error range from 0, the total current amount being calculated by using respective current detection values of the common sensor, the at least one first motor phase sensor, and the at least one second motor phase sensor.

In a winding short-circuit state, the first motor and the second motor may allow phase currents with a difference falling within a predetermined error range to flow, the difference being a difference in magnitude between a first current vector and a second current vector obtained by converting respective phase currents. The drive control unit may include a common sensor failure identification unit configured to identify a failure of the common sensor in response to a fact that it is detected that the any sensor of the common sensor, the at least one first motor phase sensor, and the at least one second motor phase sensor has failed, and the difference in magnitude between the first current vector calculated by using a current detection value of the at least one first motor phase sensor and the second current vector calculated by using a current detection value of the at least one second motor phase sensor is within the predetermined error range in a winding short-circuit state of the first motor and the second motor.

The drive control unit may include a first sensor group failure diagnosis unit configured to diagnose that the at least one second motor phase sensor is normal in response to a total current amount of flowing into the second motor being within a predetermined error range from 0 in a state where the plurality of first motor phases of the first motor are opened, the total current amount being calculated by using respective current detection values of the common sensor and the at least one second motor phase sensor.

The drive control unit may include a second sensor group failure diagnosis unit configured to diagnose that the at least one first motor phase sensor is normal in response to a total current amount of flowing into the second motor being within a predetermined error range from 0 in a state where the plurality of second motor phases of the second motor are opened, the total current amount being calculated by using respective current detection values of the common sensor and the at least one first motor phase sensor.

In a winding short-circuit state, the first motor and the second motor may allow phase currents with a difference falling within the predetermined error range to flow, the difference being a difference in magnitude between a first current vector and a second current vector obtained by converting respective phase currents. The drive control unit may include a current vector calculation unit configured to calculate, in response to diagnosis that any sensor of the at least one first motor phase sensor has failed, at least one of the first current vector by using a current detection value of the common sensor and a current detection value of each of the at least one first motor phase sensor at a timing when it is determined that a current flowing through a phase included in the phase pair among the plurality of second motor phases becomes 0 in a winding short-circuit state of the first motor and the second motor. The drive control unit may include a first sensor failure identification unit configured to identify that a first motor phase sensor that has output a current detection value used for calculation of the first current vector among the at least one first current vector has failed, the first current vector having a maximum difference in magnitude from the second current vector calculated by using the current detection value of the at least one second motor phase sensor.

The plurality of first motor phases may be three first motor phases. The plurality of second motor phases may be three second motor phases. The number of the common sensors may be one. The at least one first motor phase sensor may be two first motor phase sensors. The at least one second motor phase sensor may be two second motor phase sensors.

A second aspect of the present invention provides a motor driving method. The motor driving method may include driving, by a first drive unit, a plurality of first motor phases included in a first motor. The motor driving method may include driving, by a second drive unit, a plurality of second motor phases included in a second motor. The motor driving method may include detecting, by a common sensor, a total current flowing through a phase pair obtained by selecting one phase from the plurality of first motor phases and one phase from the plurality of second motor phases. The motor driving method may include detecting, by at least one first motor phase sensor, each current flowing through each phase not included in the phase pair among the plurality of first motor phases. The motor driving method may include detecting, by at least one second motor phase sensor, each current flowing through each phase not included in the phase pair among the plurality of second motor phases. The motor driving method may include controlling, by a drive control unit, drive amounts of the first drive unit and the second drive unit for the plurality of first motor phases and the plurality of second motor phases by using respective current detection values of the common sensor, the at least one first motor phase sensor, and the at least one second motor phase sensor.

A third aspect of the present invention provides a non-transitory computer readable medium having recorded thereon a motor drive program executed by a computer. The motor drive program may cause the computer to function as a first drive unit configured to drive a plurality of first motor phases included in a first motor. The motor drive program may cause the computer to function as a second drive unit configured to drive a plurality of second motor phases included in a second motor. The motor drive program may cause the computer to function as a drive control unit configured to control drive amounts of the first drive unit and the second drive unit for the plurality of first motor phases and the plurality of second motor phases by using respective current detection values of a common sensor configured to detect a total current flowing through a phase pair obtained by selecting one phase from the plurality of first motor phases and one phase from the plurality of second motor phases, at least one first motor phase sensor configured to detect each current flowing through each phase not included in the phase pair among the plurality of first motor phases, and at least one second motor phase sensor configured to detect each current flowing through each phase not included in the phase pair among the plurality of second motor phases.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims. In addition, not all of the combinations of features described in the embodiments are essential to the solution of the invention.

Figure 1:
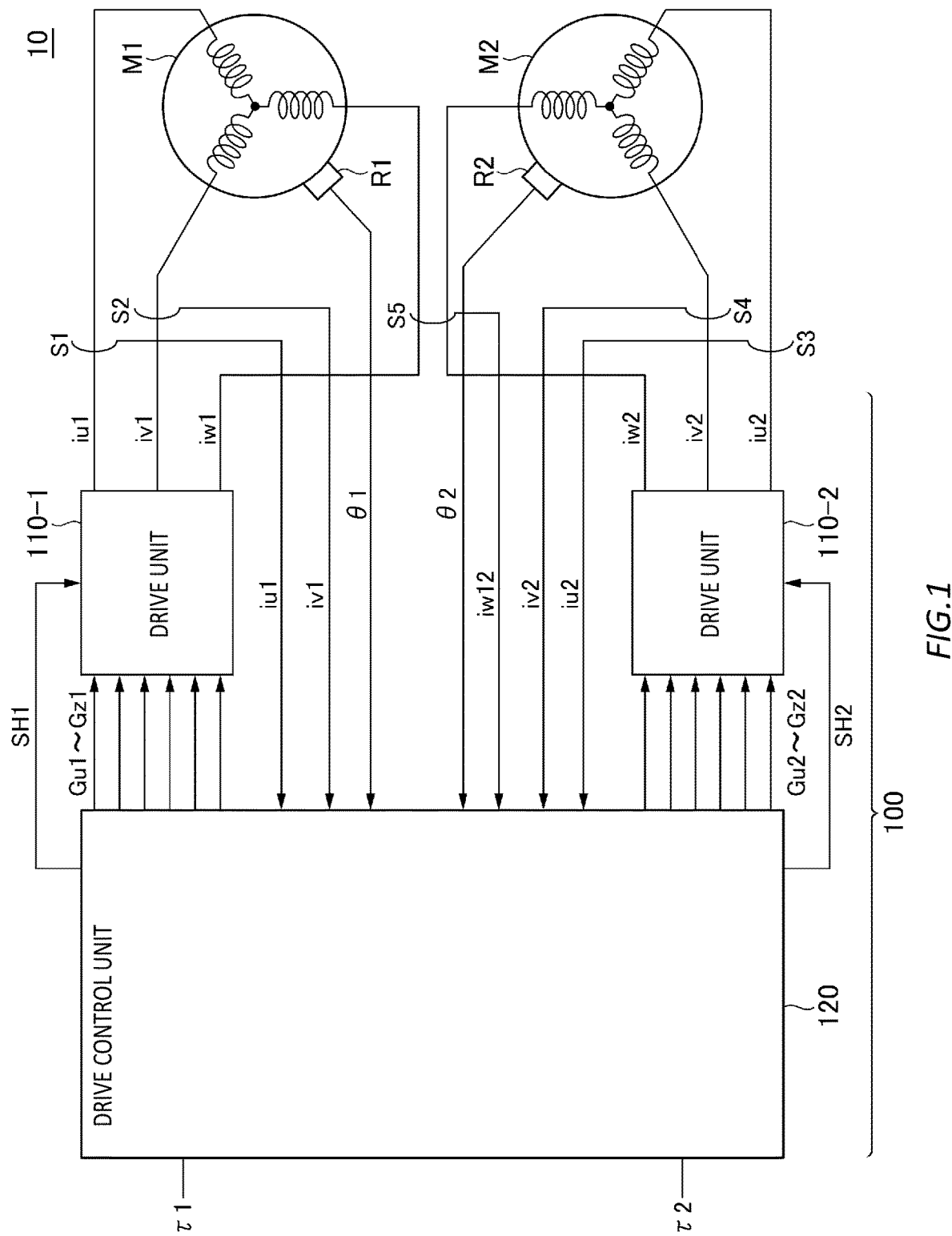
FIG. 1 illustrates a configuration of a drive system 10 according to the present embodiment.

FIG. 1 illustrates a configuration of a drive system 10 according to the present embodiment. The drive system 10 according to the present embodiment detects the sum of currents flowing through a plurality of motors at a specific phase by a common current sensor. As a result, the drive system 10 can reduce the number of current sensors as compared with a case where current sensors are individually provided for all phases of each motor.

The drive system 10 includes a plurality of motors M1 and M2, a plurality of current sensors S1 to S5 (also referred to as a "plurality of sensors S1 to S5"), a plurality of rotation angle sensors R1 and R2, and a motor drive device 100. Each of the plurality of motors M1 and M2 may be a synchronous motor or a permanent magnet (PM) motor. In the example of this figure, the drive system 10 includes two motors M1 and M2. The motor M1 is an example of a "first motor" and has a plurality of phases (also referred to as "first motor phases"). The motor M2 is an example of a "second motor" and has a plurality of phases (also referred to as "second motor phases"). In the present embodiment, the plurality of first motor phases are three first motor phases, and the plurality of second motor phases are three second motor phases.

Alternatively, the drive system 10 may include different numbers of motors and may include different numbers of phases. Each of the motors M1 and M2 has coils for respective phases connected to each other at a midpoint, and rotates according to an alternating current input to each phase.

Each of the plurality of sensors S1 to S5 detects a current flowing through each phase of the plurality of motors M1 and M2. The plurality of sensors S1 to S5 include a common sensor S5 that detects a total current flowing through a phase pair obtained by selecting one phase from the plurality of first motor phases and one phase from the plurality of second motor phases. In the present embodiment, the number of common sensors is one. The current sensor S5 detects a total current iw12 flowing through a phase pair (a pair of the W phase of the motor M1 and the W phase of the motor M2) obtained by selecting one phase (W phase) from three first motor phases (the U, V, and W phases of the motor M1) and one phase from three second motor phases (the U, V, and W phases of the motor M2).

In addition, the plurality of current sensors include at least one first motor phase sensor that detects each current flowing through each phase not included in the phase pair among the plurality of first motor phases. In the example of this figure, the at least one first motor phase sensor is two first motor phase sensors, and at least one second motor phase sensor is two second motor phase sensors. The drive system 10 includes the current sensors S1 and S2 that detect currents iu1 and iv1 flowing through the U and V phases not included in the phase pair (a pair of W phases of the motors M1 and M2) among three phases of the motor M1, respectively. In addition, the drive system 10 includes the current sensors S3 and S4 that detect currents iu2 and iv2 flowing through the U and V phases not included in the phase pair among the three phases of the motor M2, respectively.

In this manner, in the example of this figure, the common current sensor S5 is provided for the pair of the W phase of the motors M1 and M2, and no current sensor is individually provided. Therefore, the number of current sensors can be reduced as compared with a case where current sensors are individually provided in the W phase of the motor M1 and the W phase of the motor M2.

The plurality of rotation angle sensors R1 and R2 are provided corresponding to the plurality of motors M1 and M2, respectively. In the example of this figure, the rotation angle sensor R1 detects a rotation angle $\theta1$ of the motor M1. The rotation angle sensor R2 detects a rotation angle $\theta2$ of the motor M2. The rotation angle sensors R1 and R2 may detect the mechanical angles of the motors M1 and M2 and output the mechanical angles as the rotation angles $\theta1$ and $\theta2$.

The motor drive device 100 is connected to the plurality of motors M1 and M2, the plurality of current sensors S1 to S5, and the plurality of rotation angle sensors R1 and R2. The motor drive device 100 drives each phase of each motor according to command values $\tau1$ and $\tau2$ such as a torque command to each motor input from an external device or the like. The motor drive device 100 includes a plurality of drive units 110-1 and 110-2 (also referred to as a "drive unit 110") and a drive control unit 120.

The plurality of drive units 110-1 and 110-2 are provided corresponding to the plurality of motors M1 and M2, respectively and drive each phase of the corresponding motors. The drive unit 110-1 is an example of a "first drive unit", and drives the plurality of first motor phases (U, V, and W phases) included in the first motor M1. The drive unit 110-2 is an example of a "second drive unit", and drives the plurality of second motor phases (U, V, and W phases) included in the second motor M2.

The drive control unit 120 inputs the command values $\tau1$ and $\tau2$, the detection values of the currents iu1, iv1, iu2, iv2, and iw12 detected by the respective current sensors S1 to S5, and the detection values of the rotation angles $\theta1$ and $\theta2$ detected by the rotation angle sensors R1 and R2.

The drive control unit 120 uses these inputs to control the drive amounts of the drive unit 110-1 and the drive unit 110-2 for the U, V, and W phases of the motor M1 and the U, V, and W phases of the motor M2. The drive control unit 120 supplies, to the drive unit 110-1, control signals Gu1 to Gz1 for controlling the upper and lower arms of the U, V, and W phases of the motor M1 to control the drive amounts of respective phases of the motor M1. In addition, the drive control unit 120 supplies, to the drive unit 110-2, control signals Gu2 to Gz2 for controlling the upper and lower arms of the U, V, and W phases of the motor M2 to control the drive amounts of respective phases of the motor M2.

In addition, the drive control unit 120 outputs a control signal SH1 to the drive unit 110-1, and outputs a control signal SH2 to the drive unit 110-2. By using the control signals SH1 and SH2, the drive control unit 120 can instruct the corresponding motors M1 and M2 to perform the winding short-circuit or the winding opening.

Figure 2:
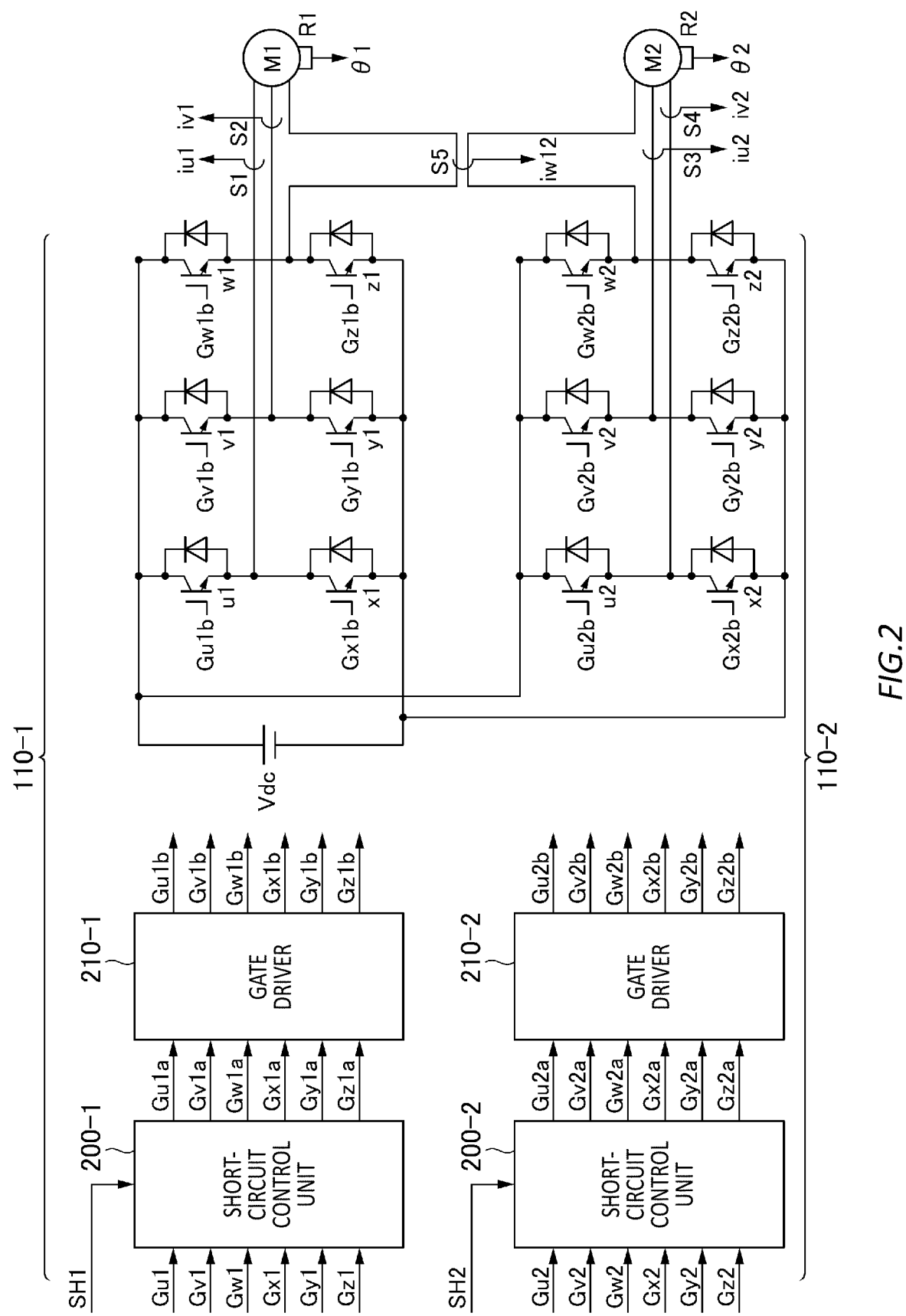
FIG. 2 illustrates configurations of drive units 110-1 and 110-2 and a connection form with motors M1 and M2 in the drive system 10 according to the present embodiment.

FIG. 2 illustrates configurations of the drive units 110-1 and 110-2 and a connection form with the motors M1 and M2 in the drive system 10 according to the present embodiment. The drive units 110-1 and 110-2 convert a DC voltage supplied from the power supply Vdc provided between the positive and negative DC bus lines into an AC voltage (a three-phase AC voltage in the present embodiment) for driving the motors M1 and M2 and supply the AC voltage to the motors M1 and M2.

The drive unit 110-1 includes each of the plurality of upper arm-side switching elements u1, v1, and w1 and each of the plurality of lower arm-side switching elements x1, y1, and z1 corresponding to each phase of the motor M1. Each upper arm-side switching element and each lower arm-side switching element may be a power semiconductor element, and is, as an example, an insulated gate bipolar transistor (IGBT) having a collector and an emitter as main terminals and a gate as a control terminal. Alternatively, each upper arm-side switching element and each lower arm-side switching element may be a MOSFET having a drain and a source as main terminals and a gate as a control terminal.

The main terminals of the upper arm-side switching element u1 and the lower arm-side switching element x1 are connected in this order in parallel with the power supply Vdc to the DC bus line on the positive side and the DC bus line on the negative side, and a first phase terminal (U-phase terminal) of the motor M1 is connected between the upper arm-side switching element u1 and the lower arm-side switching element x1. Similarly to the upper arm-side switching element u1 and the lower arm-side switching element x1, the main terminals of the upper arm-side switching element v1 and the lower arm-side switching element y1 are connected to the DC bus lines, the main terminals of the upper arm-side switching element w1 and the lower arm-side switching element z1 are connected to the DC bus lines, a second phase terminal (V-phase terminal) of the motor M1 is connected between the upper arm-side switching element v1 and the lower arm-side switching element y1, and a third phase terminal (W-phase terminal) of the motor M1 is connected between the upper arm-side switching element w1 and the lower arm-side switching element z1.

Each upper arm-side switching element and each lower arm-side switching element may have a freewheel diode reversely connected to a switching element body. Herein, when each upper arm-side switching element and each lower arm-side switching element are MOSFETs, the freewheel diode may be a parasitic diode.

The drive unit 110-1 includes a short-circuit control unit 200-1 and a gate driver 210-1.

The short-circuit control unit 200-1 outputs control signals Gu1a to Gz1a obtained by applying, to the control signals Gu1 to Gz1 supplied from the drive control unit 120, the control of the winding short-circuit or the winding opening of the motor M1 according to the control signal SH1. When the control signal SH1 instructs the winding short-circuit, the gate driver 210-1 sets the control signals Gu1a to Gw1a to a logic L (low level) and sets the control signals Gx1a to Gz1a to a logic H (high level). As a result, the short-circuit control unit 200-1 forcibly turns off the upper arm-side switching elements u1 to w1 and forcibly turns on the lower arm-side switching elements x1 to z1 to short-circuit all phases of the motor M1 via the lower arm-side switching elements x1 to z1. Alternatively, during the winding short-circuit, the short-circuit control unit 200-1 may forcibly turn on the upper arm-side switching elements u1 to w1 and forcibly turn off the lower arm-side switching elements x1 to z1.

When the control signal SH1 instructs the winding opening, the short-circuit control unit 200-1 sets the control signals Gu1a to Gz1a to the logic L. As a result, the gate driver 210-1 forcibly turns off all the switching elements u1 to z1 and opens all the phases of the motor M1.

The gate driver 210-1 outputs control signals Gu1b to Gz1b obtained by amplifying the control signals Gu1a to Gz1a. The control signals Gu1b, Gv1b, and Gw1b are supplied to the control terminals of the upper arm-side switching elements u1, v1, and w1. The control signals Gx1b, Gy1b, and Gz1b are supplied to the control terminals of the lower arm-side switching elements x1, y1, and z1.

The drive unit 110-2 includes each of the plurality of upper arm-side switching elements u2, v2, and w2 and each of the plurality of lower arm-side switching elements x2, y2, and z2 corresponding to each phase of the motor M2. Since the switching elements u2 to z2 are similar to the switching elements u1 to z1 except that the switching elements u2 to z2 are used for driving the motor M2, the description thereof will be omitted.

The drive unit 110-2 includes a short-circuit control unit 200-2 and a gate driver 210-2. Similarly to the short-circuit control unit 200-1, the short-circuit control unit 200-2 outputs control signals Gu2a to Gz2a obtained by applying, to the control signals Gu2 to Gz2 supplied from the drive control unit 120, the control of the winding short-circuit or the winding opening of the motor M2 according to the control signal SH2. Similarly to gate driver 210-1, the gate driver 210-2 outputs control signals Gu2b to Gz2b obtained by amplifying the control signals Gu2a to Gz2a. The control signals Gu2b, Gv2b, and Gw2b are supplied to the control terminals of the upper arm-side switching elements u2, v2, and w2. The control signals Gx2b, Gy2b, and Gz2b are supplied to the control terminals of the lower arm-side switching elements x2, y2, and z2.

Figure 3:
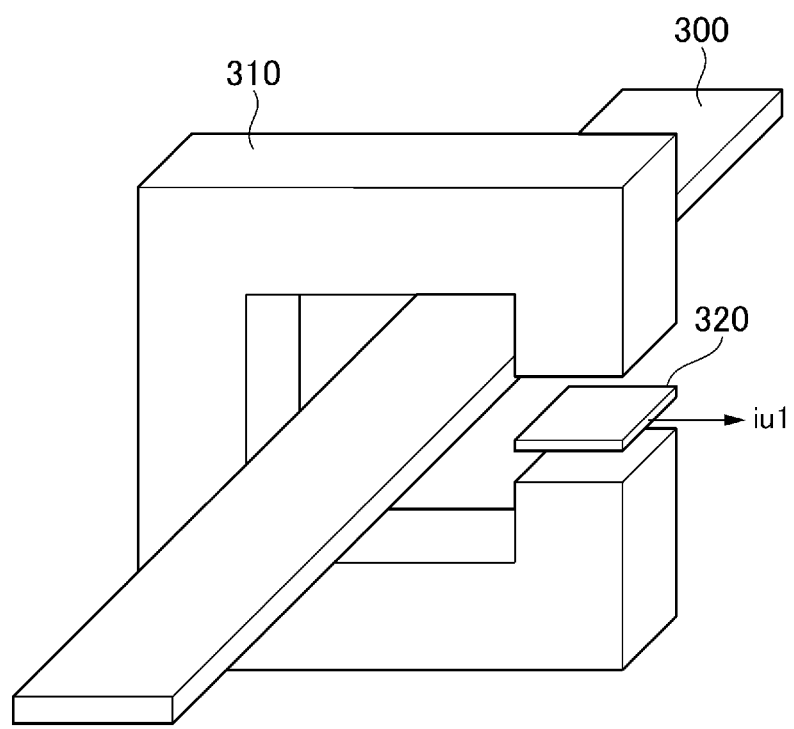
FIG. 3 illustrates an example of a structure of a sensor S1 according to the present embodiment.

FIG. 3 illustrates an example of a structure of the sensor S1 according to the present embodiment. The sensor S1 is provided on a conductor 300 that is a wiring connecting the midpoint of the upper arm-side switching element u1 and the lower arm-side switching element x1 of the drive unit 110-1 and the U-phase of the motor M1. The sensor S1 includes a magnetic core 310 and a magnetic sensor 320.

The magnetic core 310 is an annular soft magnetic material that surrounds the outer circumference of the conductor 300 at a specific place of the conductor 300. The magnetic core 310 focuses a spiral magnetic field generated around the conductor 300 according to the current flowing through the conductor 300. The magnetic sensor 320 is disposed in a gap provided at a specific place on the circumference of the magnetic core 310, and outputs, as a current detection value, a detection value corresponding to the magnitude of the magnetic field focused by the magnetic core 310. The sensors S2 to S4 may have functions and configurations similar to those of the sensor S1.

Figure 4:
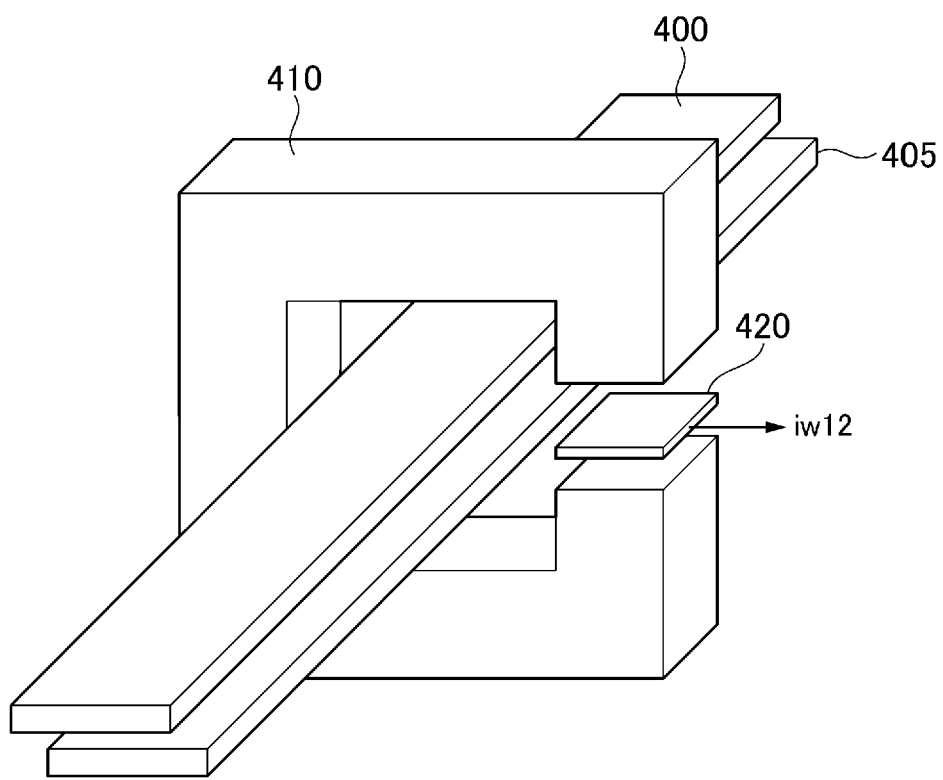
FIG. 4 illustrates an example of a structure of a sensor S5 according to the present embodiment.

FIG. 4 illustrates an example of a structure of the sensor S5 according to the present embodiment. In the figure, a first conductor 400 is a wiring that connects the midpoint of the upper arm-side switching element w1 and the lower arm-side switching element z1 of the drive unit 110-1 and the W-phase of the motor M1. A second conductor 405 is a wiring that connects the midpoint of the upper arm-side switching element w2 and the lower arm-side switching element z2 of the drive unit 110-2 and the W-phase of the motor M2. The first conductor 400 and the second conductor 405 travel substantially in parallel in close proximity at a place where the sensor S5 is provided.

The sensor S5 includes a magnetic core 410 and a magnetic sensor 420. The magnetic core 410 is an annular soft magnetic material that surrounds the outer circumference of a set of the first conductor 400 and the second conductor 405. The magnetic core 410 focuses a spiral magnetic field generated around the first conductor 400 and the second conductor 405 according to the sum of currents flowing through the first conductor 400 and the second conductor 405. The magnetic sensor 420 is disposed in a gap provided at a specific place on the circumference of the magnetic core 410, and outputs, as a current detection value, a detection value corresponding to the magnitude of the magnetic field focused by the magnetic core 410. As a result, the sensor S5 can detect the current iw12 (=iw1+iw2), which is the sum of the current iw1 flowing into the W phase of the motor M1 and the current iw2 flowing into the W phase of the motor M2, by using one magnetic core and one magnetic sensor.

Figure 5:
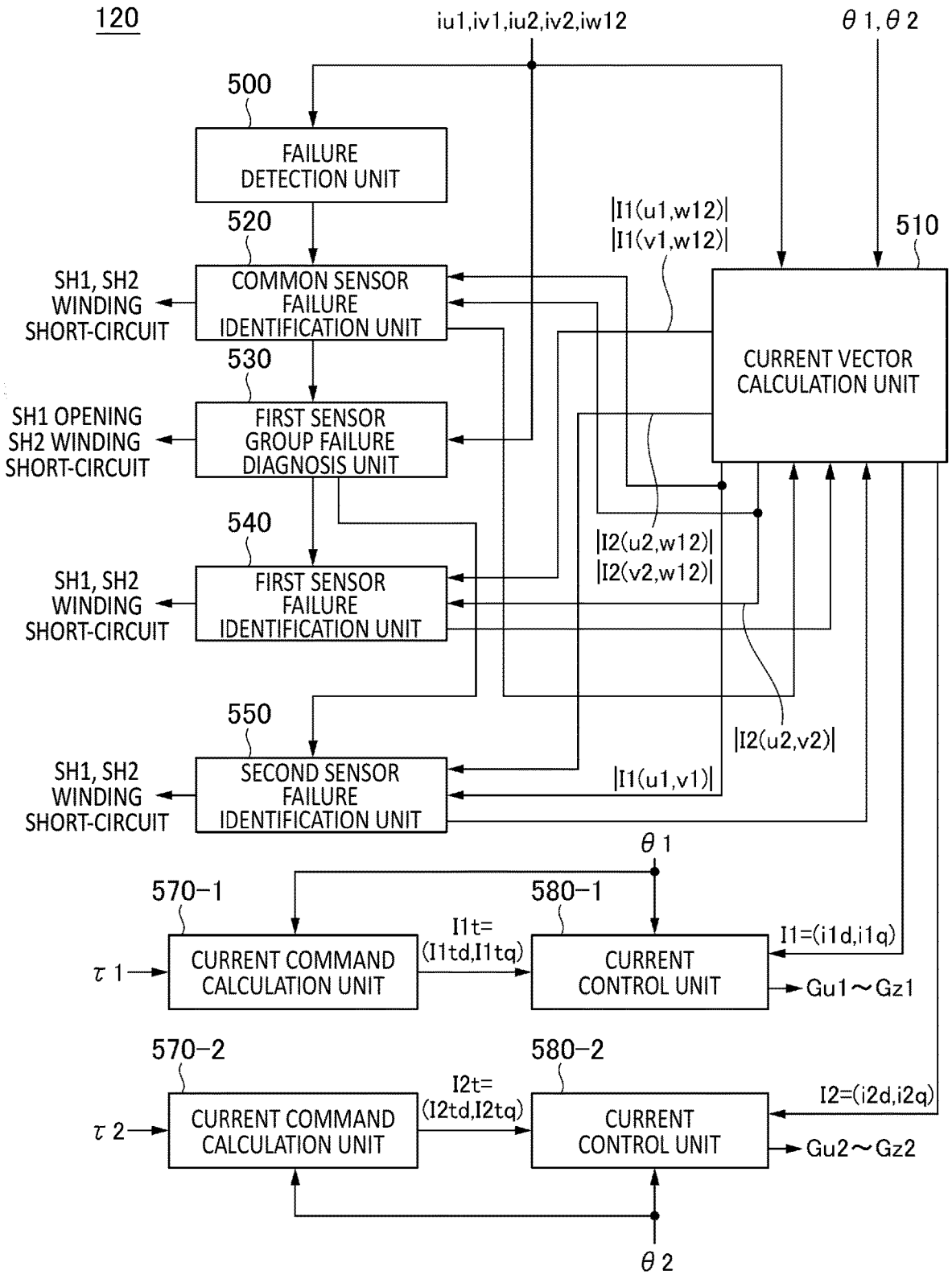
FIG. 5 illustrates a configuration of a drive control unit 120 according to the present embodiment.

FIG. 5 illustrates a configuration of the drive control unit 120 according to the present embodiment. The drive control unit 120 may be realized by causing a CPU such as a microcontroller or a processor for motor control, a computer including the CPU, or the like to execute a motor drive program. Alternatively, the drive control unit 120 may be realized by a hardware circuit.

In the present embodiment, the drive control unit 120 identifies a failed sensor for a single failure of the plurality of sensors S1 to S5 (that is, a failure of any one of the sensors), and enables continuous driving of each of the motors M1 and M2 by using a current detection value other than the failed sensor. The drive control unit 120 includes a failure detection unit 500, a current vector calculation unit 510, a common sensor failure identification unit 520, a first sensor group failure diagnosis unit 530, a first sensor failure identification unit 540, a second sensor failure identification unit 550, a plurality of current command calculation units 570-1 and 570-2 (also referred to as "current command calculation unit(s) 570"), and a plurality of current control units 580-1 and 580-2 (also referred to as "current control unit(s) 580").

The failure detection unit 500 inputs current detection values iu1, iv1, iu2, iv2, and iw12 of the plurality of sensors S1 to S5. By using these current detection values, the failure detection unit 500 detects whether any of the plurality of sensors S1 to S5 has failed. A specific operation of the failure detection unit 500 will be described below with reference to FIG. 6.

The current vector calculation unit 510 inputs the current detection values iu1, iv1, iu2, iv2, and iw12 of the plurality of sensors S1 to S5 and the rotation angle detection values θ1 and θ2 of the rotation angle sensors R1 and R2. By using these detection values, the current vector calculation unit 510 calculates a plurality of current vectors used for failure diagnosis of the plurality of sensors S1 to S5 and a plurality of current vectors used for drive control of the plurality of motors M1 and M2.

The common sensor failure identification unit 520 is connected to the failure detection unit 500 and the current vector calculation unit 510. In response to the detection of the failure in any of the sensors by the failure detection unit 500, the common sensor failure identification unit 520 uses the current vector for failure diagnosis input from the current vector calculation unit 510 to identify whether the common sensor S5 has failed. A specific operation of the common sensor failure identification unit 520 will be described below with reference to FIG. 7.

The first sensor group failure diagnosis unit 530 is connected to the common sensor failure identification unit 520. The first sensor group failure diagnosis unit 530 inputs the current detection values of the plurality of sensors S1 to S5. By using these current detection values, the first sensor group failure diagnosis unit 530 diagnoses whether any sensor of the first motor phase sensors S1 and S2 (the sensors of the first sensor group) has failed or whether any sensor of the second motor phase sensors S3 and S4 (the sensors of the second sensor group) has failed. A specific operation of the first sensor group failure diagnosis unit 530 will be described below with reference to FIG. 9.

The first sensor failure identification unit 540 is connected to the current vector calculation unit 510 and the first sensor group failure diagnosis unit 530. In response to the diagnosis of the first sensor group failure diagnosis unit 530 that any of the first motor phase sensors S1 and S2 has failed, the first sensor failure identification unit 540 identifies the failed sensor in the first motor phase sensors S1 and S2 by using the current vector for failure diagnosis input from the current vector calculation unit 510. A specific operation of the first sensor failure identification unit 540 will be described below with reference to FIG. 10.

The second sensor failure identification unit 550 is connected to the current vector calculation unit 510 and the first sensor group failure diagnosis unit 530. In response to the diagnosis of the first sensor group failure diagnosis unit 530 that any of the second motor phase sensors S3 and S4 has failed, the second sensor failure identification unit 550 identifies the failed sensor in the second motor phase sensors S3 and S4 by using the current vector for failure diagnosis input from the current vector calculation unit 510. The specific operation of the second sensor failure identification unit 550 is similar to the operation of the first sensor failure identification unit 540 described below with reference to FIG. 10.

The plurality of current command calculation units 570 are provided corresponding to the plurality of motors M1 and M2, respectively. The current command calculation unit 570-1 inputs the rotation angle detection value θ1 of the motor M1 and the torque command value τ1 that specifies the torque for driving the motor M1, and generates a current command value I1$t$ ($=$(I1$td$, I1$tq$)) in a vector form from the rotation angle detection value θ1 and the torque command value τ1. The current command calculation unit 570-2 inputs the rotation angle detection value θ2 of the motor M2 and the torque command value τ2 that specifies the torque for driving the motor M2, and generates a current command value I2$t$ ($=$(I2$td$, I2$tq$)) in a vector form from the rotation angle detection value θ2 and the torque command value τ2.

The plurality of current control units 580 are provided corresponding to the plurality of motors M1 and M2, respectively. The current control unit 580-1 inputs the rotation angle detection value θ1 of the motor M1, the current command value I1$t$ ($=$(I1$td$, I1$tq$)) from the current command calculation unit 570-1, and a current vector I1($=$(I1$d$, I1$q$)) which is calculated by the current vector calculation unit 510 and is a current detection value obtained by converting the phase current detection value of the motor M1 into a rotating coordinate system, and generates the drive signals Gu1 to Gz1 to bring the current vector I1 close to (or match) the current command value I1$t$. The current control unit 580-1 supplies the generated drive signals Gu1 to Gz1 to the drive unit 110-1.

The current control unit 580-2 inputs the rotation angle detection value θ2 of the motor M2, the current command value I2$t$ ($=$(I2$td$, I2$tq$)) from the current command calculation unit 570-2, and a current vector I2($=$(I2$d$, I2$q$)) which is calculated by the current vector calculation unit 510 and is a current detection value obtained by converting the phase current detection value of the motor M2 into the rotating coordinate system, and generates the drive signals Gu2 to Gz2 to bring the current vector I2 close to (or match) the current command value I2$t$. The current control unit 580-2 supplies the generated drive signals Gu2 to Gz2 to the drive unit 110-2.

Figure 6:
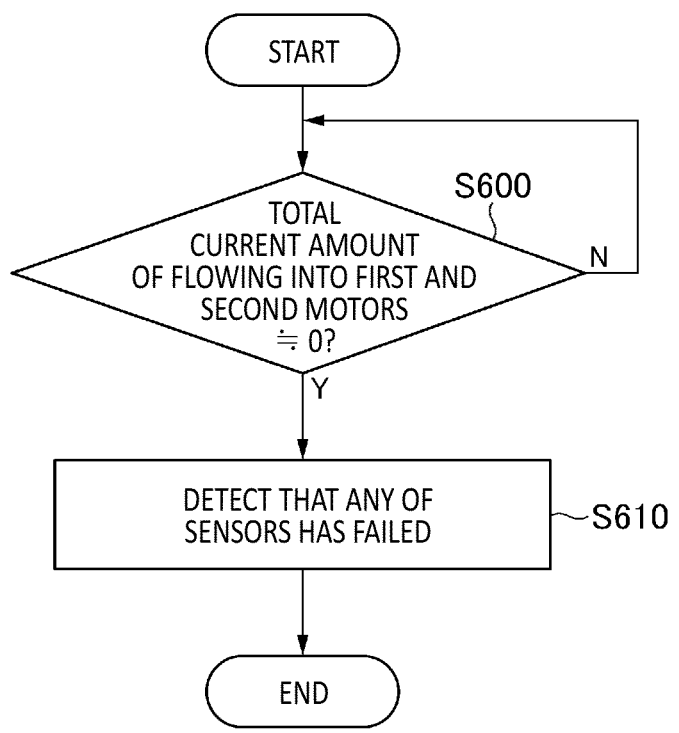
FIG. 6 illustrates an operation flow of a failure detection unit 500 according to the present embodiment.

FIG. 6 illustrates an operation flow of the failure detection unit 500 according to the present embodiment. In S600, the failure detection unit 500 determines whether a total current amount $I_{total}$ of flowing into the first motor M1 and the second motor M2 is about 0, the total current amount being calculated by using the respective current detection values (iw12, iu1, iv1, iu2, and iv2) of the common sensor S5, the first motor phase sensors S1 and S2, and the second motor phase sensors S3 and S4.

Herein, since each of the motors M1 and M2 does not have a path for inputting and outputting a current to a terminal other than the terminal of each phase, the sum of the current amounts (negative current amounts in the case of outflow) of flowing into each motor from the terminals of all phases is theoretically 0. Therefore, the total current amount $I_{total}$=iu1+iv1+iu2+iv2+iw12, which are detected by the plurality of sensors S1 to S5, of flowing into the plurality of motors M1 and M2 is theoretically 0. However, since the plurality of sensors S1 to S5 actually have a measurement error, the total current amount $I_{total}$ does not necessarily match 0 and has a certain degree of error. In this regard, the failure detection unit 500 determines whether the total current amount $I_{total}$ is within a range (within a range of 0±tolerance $\Delta_{total}$) of a predetermined error (tolerance) from 0.

In S610, in response to the total current amount $I_{total}$ being outside the range of the predetermined tolerance from 0 ("Y" in S600), the failure detection unit 500 detects that any of the sensors has failed. When any sensor of the plurality of sensors S1 to S5 has failed, the current detection value of the failed sensor is different from the original value, and thus the total current amount $I_{total}$ deviates from 0. Therefore, in response to the total current amount $I_{total}$ deviating from 0 (falling outside the range of the tolerance $\Delta_{total}$ from 0), the failure detection unit 500 can detect that any of the sensors has failed. When the total current amount $I_{total}$ is within the range of the tolerance from 0 ("N" in S600), the failure detection unit 500 advances the processing to S600 to continue the failure occurrence monitoring.

According to the failure detection unit 500 described above, even when current sensors are not provided in all the phases of all the motors, the failure of any of the sensors can be detected by using the current detection value from the common sensor that detects the total current flowing through the phase pair obtained by selecting one phase from each motor. Note that the failure detection unit 500 may sense the failure in response to the total current amount $I_{total}$ instantaneously deviating from 0. Alternatively, the failure detection unit 500 may sense the failure in response to the total current amount $I_{total}$ deviating from 0 continuously for a predetermined period (for example, a period less than ½ of the minimum cycle corresponding to the maximum frequency of the phase current). Note that, even when there are two or more common sensors, by using the operation flow illustrated in FIG. 6, the failure detection unit 500 may detect that any of the sensors has failed.

Figure 7:
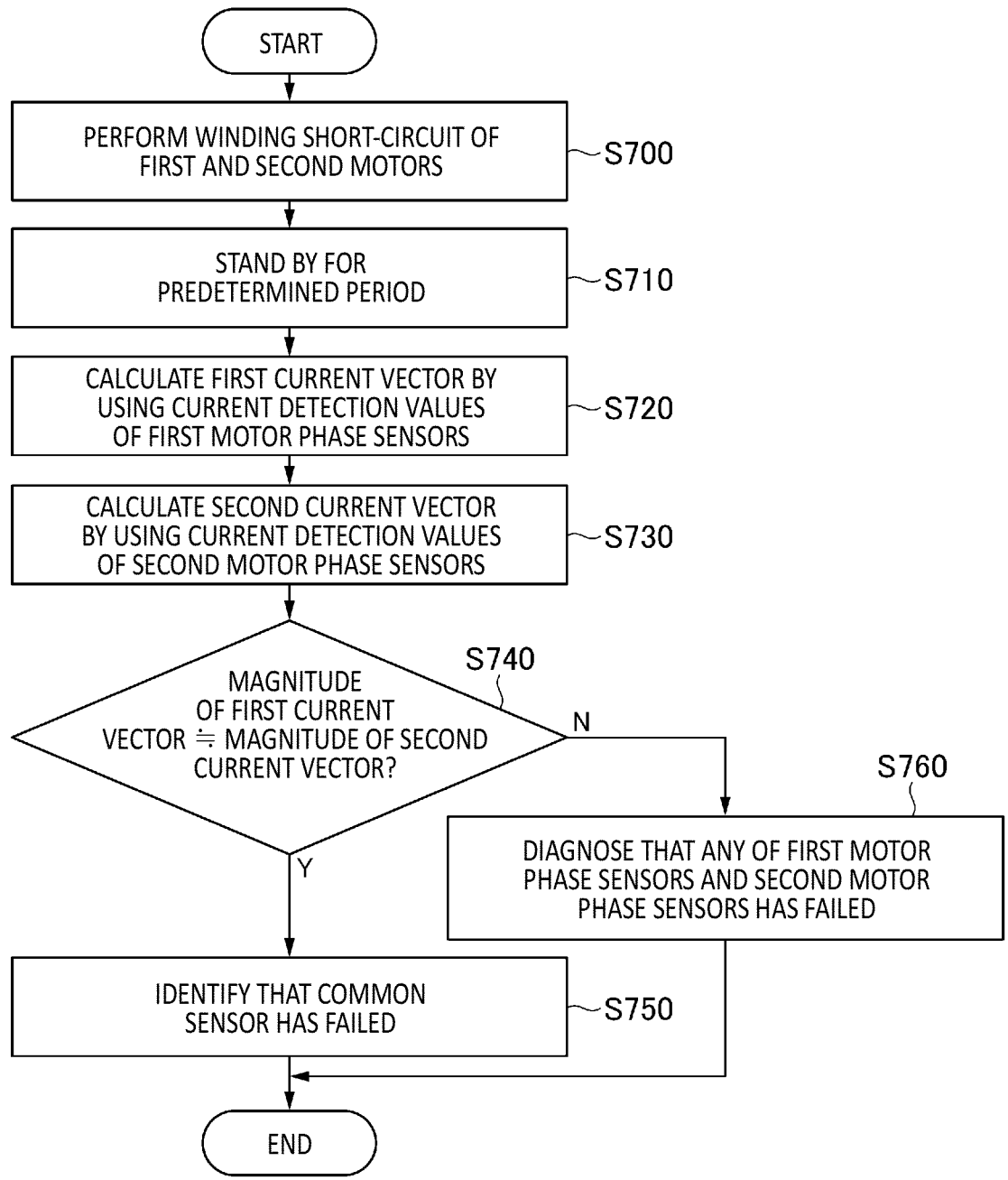
FIG. 7 illustrates an operation flow of a common sensor failure identification unit 520 according to the present embodiment.

FIG. 7 illustrates an operation flow of the common sensor failure identification unit 520 according to the present embodiment. In the operation flow of FIG. 7, the common sensor failure identification unit 520 identifies the failure of the common sensor S5 on the assumption that the plurality of motors M1 and M2 of the drive system 10 allow phase currents of substantially the same magnitude (amplitude) to flow (note that the phases may be shifted). Examples of such a drive system 10 include a system in which the motors M1 and M2 are the same type of products and are used for rotation of the same shaft (the rotation of left and right wheels of a vehicle or the like), and a system in which the motors M1 and M2 are the same type of products and are used for rotation of different shafts of the same vehicle or the like.

In S700, by using the control signals SH1 and SH2, the common sensor failure identification unit 520 instructs the drive units 110-1 and 110-2 to bring the plurality of motors M1 and M2 into a winding short-circuit state. In the winding short-circuit state, the motor M1 and the motor M2 allow phase currents with a difference falling within a predetermined error range to flow, the difference being a difference in magnitude between a first current vector and a second current vector obtained by converting the respective phase currents.

In S710, the common sensor failure identification unit 520 stands by for a predetermined period. As a result, the common sensor failure identification unit 520 waits until the phase currents of the motor M1 and the motor M2 reach a steady state in the winding short-circuit.

In S720, the current vector calculation unit 510 calculates a magnitude |I1($u$1, v1)| of the first current vector by using current detection values iu1 and iv1 of the first motor phase sensors S1 and S2 in the winding short-circuit state of the motor M1. In other words, the current vector calculation unit 510 calculates the first current vector by using the current detection value of each phase, other than the phase in which the common sensor S5 is provided, among the plurality of phases of the motor M1, and calculates the magnitude of the first current vector. Note that the notation of I1($u$1, v1) means a current vector obtained by converting the phase current of the motor M1 into the rotating coordinate system, the phase current being calculated by using the current detection value iu1 of the current sensor S1 provided in the U phase (u1) of the motor M1 and the current detection value iv1 of the current sensor S2 provided in the V phase (v1) of the motor M1.

The current vector calculation unit 510 calculates a first current vector I1($u$1, v1) by d-q converting a set of iu1, iv1, and iw1 of the phase currents of the motor M1. Since a total current flowing into the motor M1 is 0, the current vector calculation unit 510 does not use the W-phase current detection value as iw1=−iu1−iv1 in the calculation of the first current vector I1($u$1, v1).

Expression (1) is a calculation expression of the first current vector I1($u$1, v1) in a case where the motor M1 has three phases.

[Mathematical Formula 1]

$$\begin{bmatrix} I_1 d \\ I_1 q \end{bmatrix} = \frac{2}{3} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} i_{u1} \\ i_{v1} \\ i_{w1} \end{bmatrix} \quad (1)$$

(where $i_{w1} = -i_{u1} - i_{v1}$)

Herein, I1$d$ and I1$q$ are a d-axis component and a q-axis component of the first current vector I1($u$1, v1), and θ is a value obtained by converting the rotation angle detection value θ1 of the motor M1 into an electrical angle.

The current vector calculation unit 510 calculates the magnitude |I1($u$1, v1)| of the first current vector by Expression (2).

[Mathematical Formula 2]

$$|I1_{(u1,v1)}| = \sqrt{I_1 d^2 + I_1 q^2} \quad (2)$$

In S730, similarly to the calculation of the magnitude |I1($u$1, v1)| of the first current vector, the current vector calculation unit 510 calculates a magnitude |I2($u$2, v2)| of the second current vector by using the current detection values iu2 and iv2 of the second motor phase sensors S3 and S4 in the winding short-circuit state of the motor M2. Expression (3) is a calculation expression of the second current vector I2(u2, v2) in a case where the motor M2 has three phases.

[Mathematical Formula 3]

$$\begin{bmatrix} I_2d \\ I_2q \end{bmatrix} = \frac{2}{3} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} i_{u2} \\ i_{v2} \\ i_{w2} \end{bmatrix} \quad (3)$$

(where $i_{w2} = -i_{u2} - i_{v2}$)

Herein, I2d and I2q are a d-axis component and a q-axis component of the second current vector I2(u2, v2), and θ is a value obtained by converting the rotation angle detection value θ2 of the motor M2 into an electrical angle.

The current vector calculation unit 510 calculates the magnitude |I2(u2, v2)| of the second current vector by Expression (4).

[Mathematical Formula 4]

$$|I2_{(u2,v2)}| = \sqrt{I_2d^2 + I_2q^2} \quad (4)$$

In S740, the common sensor failure identification unit 520 determines whether the magnitude (|I1(u1, v1)|) of the first current vector and the magnitude (|I2(u2, v2)|) of the second current vector are substantially equal.

Herein, the current detection values of the sensors S1 to S4 may include an error. In this regard, the common sensor failure identification unit 520 may determine whether a difference between the magnitude |I1(u1, v1)| of the first current vector and the magnitude |I2(u2, v2)| of the second current vector is within a predetermined error range ($\pm\Delta_{uv}$). When the magnitude |I1(u1, v1)| of the first current vector and the magnitude |I2(u2, v2)| of the second current vector are substantially equal, the common sensor failure identification unit 520 advances the processing to S750.

In S750, in response to the difference between the magnitude |I1(u1, v1)| of the first current vector and the magnitude |I2(u2, v2)| of the second current vector being within the predetermined error range ($\pm\Delta_{uv}$), the common sensor failure identification unit 520 identifies that the common sensor S5 has failed. In the operation flow of this figure, it is assumed that the motor M1 and the motor M2 allow the phase currents of substantially the same magnitude (amplitude) to flow. Assuming a single failure, there is a possibility that only any one of the sensors S1 to S4 has failed, and thus at least one of the first current vector I1(u1, v1) calculated by using the current detection values of the sensors S1 and S2 and the second current vector I2(u2, v2) calculated by using the current detection values of the sensors S3 and S4 is correct. Therefore, when the magnitude of the first current vector I1(u1, v1) and the magnitude of the second current vector I2(u2, v2) are substantially equal, both the first current vector I1(u1, v1) and the second current vector I2(u2, v2) can be regarded as correct that the sensors S1 to S4 are normal.

In this regard, when the failure detection unit 500 detects that any sensor of the common sensor S5, at least one of the first motor phase sensors S1 and S2, and at least one of the second motor phase sensors S3 and S4 has failed, the common sensor failure identification unit 520 identifies that the common sensor S5 has failed in S750, releases the winding short-circuit state of each motor, and ends the operation flow of FIG. 7.

When the magnitude |I1(u1, v1)| of the first current vector and the magnitude |I2(u2, v2)| of the second current vector are not substantially equal in S740, the common sensor failure identification unit 520 advances the processing to S760. In S760, the common sensor failure identification unit 520 diagnoses that any one of the first motor phase sensors S1 and S2 and the second motor phase sensors S3 and S4 has failed.

According to the common sensor failure identification unit 520 described above, it is possible to identify such a failure of the common current sensor even in the case of providing the common current sensor in a phase pair obtained by selecting one phase from each motor instead of providing individual current sensors for some phases of each motor.

The common sensor failure identification unit 520 may make the determination in S740 by using the first current vector I1(u1, v1) and the second current vector I2(u2, v2) at one time point or at a plurality of time points. In addition, the common sensor failure identification unit 520 may make the determination in S740 by using an average value of the magnitude |I1(u1, v1)| of the first current vector and the magnitude |I2(u2, v2)| of the second current vector in a predetermined period.

In this operation flow, the common sensor failure identification unit 520 determines the presence or absence of a failure in the common sensor S5 by using a comparison result between the magnitude |I1(u1, v1)| of the first current vector and the magnitude |I2(u2, v2)| of the second current vector. Thus, the directions of the first current vector I1(u1, v1) and the second current vector I2(u2, v2) do not affect the determination. Therefore, the current vector calculation unit 510 may set θ in Expressions (1) and (3) to a predetermined fixed value (for example, 0°) instead of the value based on the rotation angle detection values θ1 and θ2 by the rotation angle sensors R1 and R2.

Figure 8:
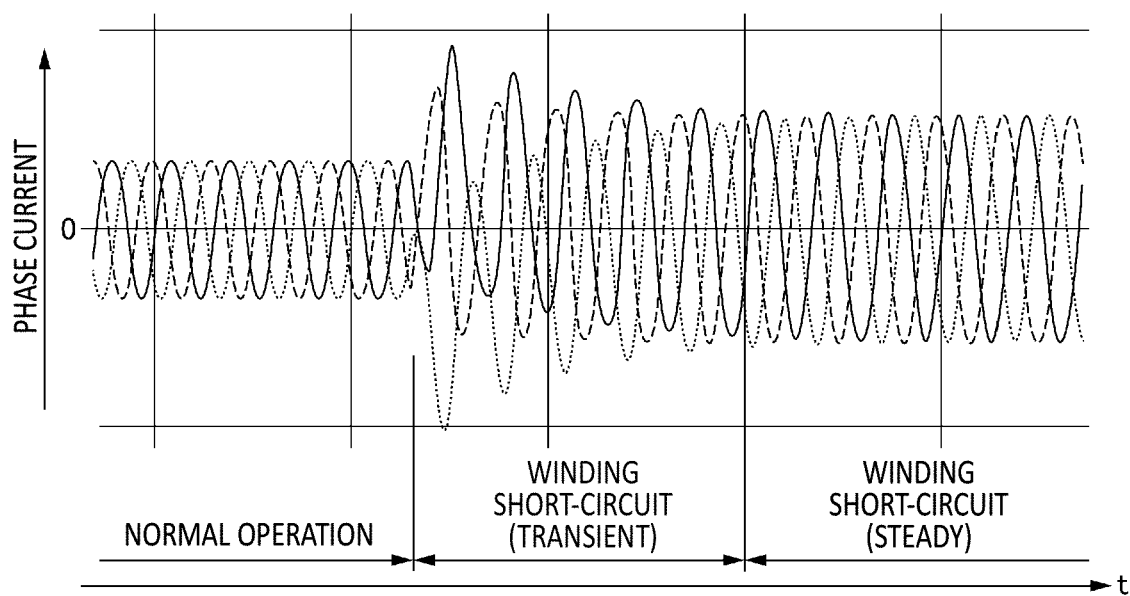
FIG. 8 illustrates an example of a waveform of a phase current flowing through the motors M1 and M2.

FIG. 8 illustrates an example of the waveform of the phase current flowing through the motors M1 and M2. During the normal operation, each drive unit 110 supplies a phase current to each phase of each motor to drive each motor. When the state is switched to the winding short-circuit state in S700 of FIG. 7, each drive unit 110 stops driving each motor. The phase current of each motor changes transiently for a while after the winding short-circuit state. In S710, the common sensor failure identification unit 520 stands by for a period sufficient for the phase current to be in a steady state after the transient change in the phase current ends. As a result, in S740, the common sensor failure identification unit 520 can accurately compare the magnitude |I1(u1, v1)| of the first current vector and the magnitude |I2(u2, v2)| of the second current vector.

Figure 9:
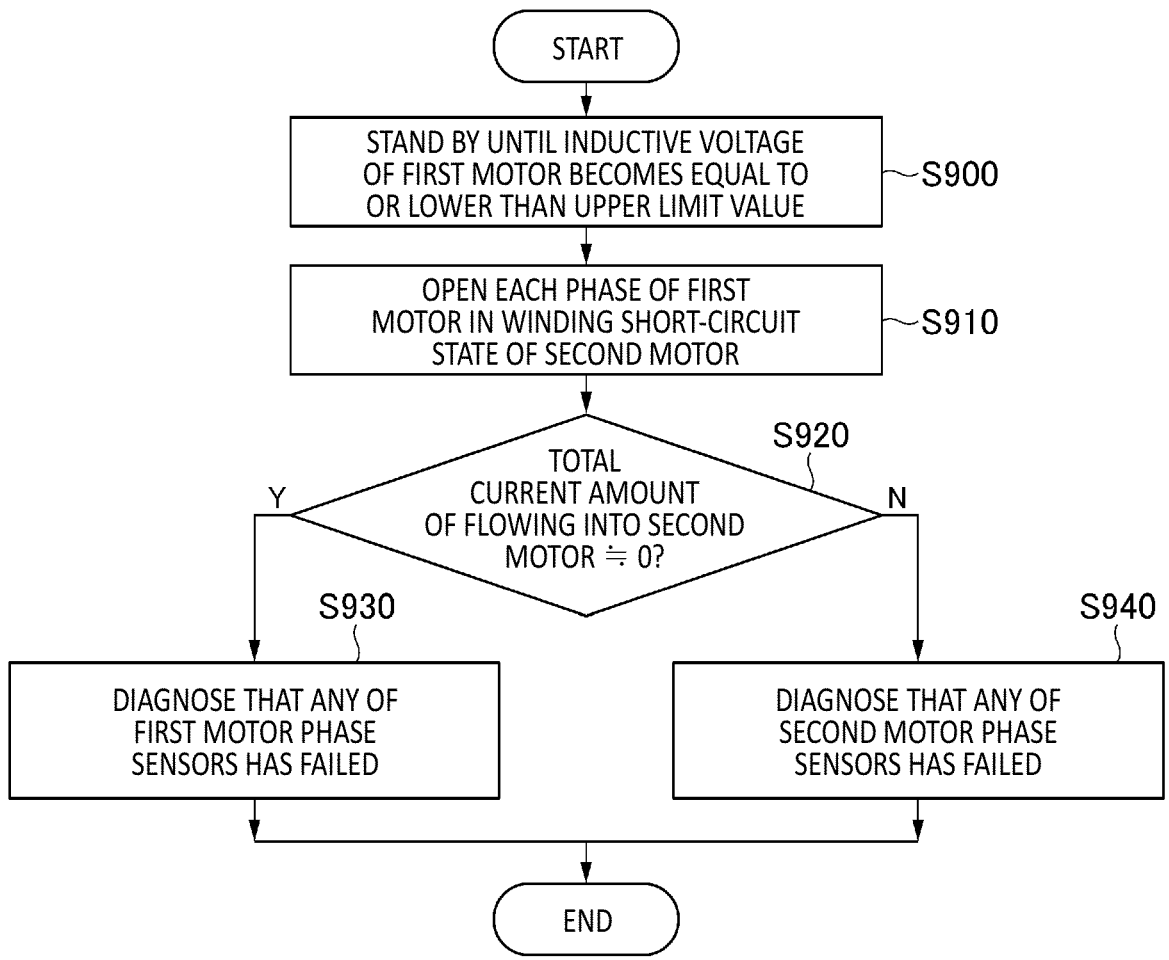
FIG. 9 illustrates an operation flow of a first sensor group failure diagnosis unit 530 according to the present embodiment.

FIG. 9 illustrates an operation flow of the first sensor group failure diagnosis unit 530 according to the present embodiment. The first sensor group failure diagnosis unit 530 may execute the operation flow of this figure in response to the diagnosis in the operation flow of FIG. 7 that any one of the first motor phase sensors S1 and S2 and the second motor phase sensors S3 and S4 has failed.

In S900, the first sensor group failure diagnosis unit 530 brings the plurality of motors M1 and M2 into the winding short-circuit state by using the control signals SH1 and SH2, and stands by until the inductive voltage of the first motor M1 becomes equal to or lower than an upper limit value. The first sensor group failure diagnosis unit 530 may determine that the inductive voltage of the motor M1 has become equal to or lower than the upper limit value in response to the rotation speed (the number of rotations per unit time) of the motor M1 becoming equal to or lower than a predetermined reference value. Alternatively, the first sensor group failure diagnosis unit 530 may once switch the motor M1 to the winding open state at predetermined intervals, and return the motor M1 to the winding short-circuit state when the voltage between any of the phases is equal to or higher than the upper limit value, thereby standing by until the inductive voltage of the motor M1 becomes equal to or lower than the upper limit value. The first sensor group failure diagnosis unit 530 may use a power supply voltage Vdc as the upper limit value.

In S910, the first sensor group failure diagnosis unit 530 brings the motor M1 into the winding open state in the winding short-circuit state of the motor M2. When the motor M1 is in the winding open state, no current flows through the plurality of phases of the motor M1. Therefore, in the winding open state of the motor M1, the common sensor S5 can detect the current iw2 flowing through the W phase of the motor M2.

In S920, in a state where the plurality of phases of the motor M1 are opened, the first sensor group failure diagnosis unit 530 calculates the total current amount (=iu2+iv2+iw2) of flowing into the motor M2 by using the respective current detection values iu2, iv2, and iw12 (=iw2) of the common sensor S5 and the second motor phase sensors S3 and S4. The first sensor group failure diagnosis unit 530 determines whether the total current amount of flowing into the motor M2 is substantially 0. In response to the total current amount of flowing into the motor M2 being within a predetermined error range from 0, the first sensor group failure diagnosis unit 530 may determine that the total current amount of flowing into the motor M2 is substantially 0.

In S930, in response to the total current amount of flowing into the motor M2 being substantially 0 ("Y" in S920), the first sensor group failure diagnosis unit 530 diagnoses that each of the second motor phase sensors S3 and S4 and the common sensor S5 is normal. In this case, since the failure of any one of the sensors S1 to S5 has been detected, the first sensor group failure diagnosis unit 530 diagnoses that any sensor of the first motor phase sensors S1 and S2 has failed.

In S940, in response to the total current amount of flowing into the motor M2 not being substantially 0 ("N" in S920), the first sensor group failure diagnosis unit 530 diagnoses that each of the first motor phase sensors S1 and S2 is normal. In this case, since the failure of any one of the sensors S1 to S5 has been detected, the first sensor group failure diagnosis unit 530 diagnoses that any one of the sensors S3 to S5 has failed. Herein, since it is diagnosed in S760 of FIG. 7 that any one of the sensors S1 to S4 has failed, the first sensor group failure diagnosis unit 530 diagnoses that any one of the second motor phase sensors S3 and S4 has failed.

According to the first sensor group failure diagnosis unit 530 described above, the motor M1 is brought into the winding open state, so that the phase current of only the motor M2 can be measured by using the common sensor S5. As a result, the first sensor group failure diagnosis unit 530 can determine the presence or absence of a failure in the sensors S3 to S5 used to calculate the total current amount of flowing into the motor M2. As a result, the first sensor group failure diagnosis unit 530 can diagnose whether any one of the first motor phase sensors S1 and S2 that measure only the phase current of the motor M1 has failed.

In the operation flow of FIG. 9, it is not assumed that the plurality of motors M1 and M2 of the drive system 10 allow the phase currents of substantially the same magnitude (amplitude) to flow. Therefore, for example, even when each of the plurality of motors M1 and M2 independently drives a different shaft, using this operation flow, the first sensor group failure diagnosis unit 530 can diagnose whether any one of the first motor phase sensors S1 and S2 that measure only the phase current of the motor M1 has failed.

In addition, even when there are two or more common sensors, by using the operation flow illustrated in FIG. 9, the first sensor group failure diagnosis unit 530 may diagnose which group of sensor among at least one first motor phase sensor, at least one second motor phase sensor, and the two or more common sensors has failed.

Figure 10:
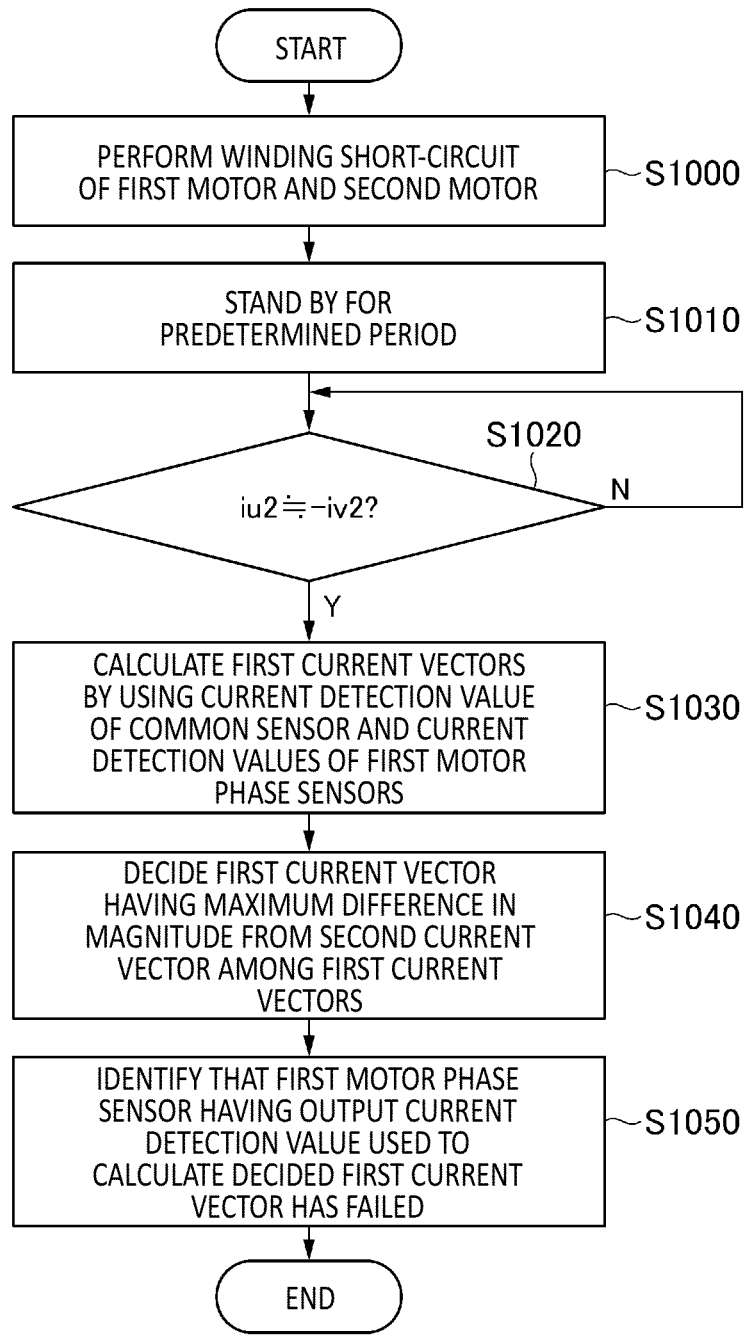
FIG. 10 illustrates an operation flow of the first sensor failure identification unit 540 according to the present embodiment.

FIG. 10 illustrates an operation flow of the first sensor failure identification unit 540 according to the present embodiment. The first sensor failure identification unit 540 may execute the operation flow of this figure in response to the diagnosis in the operation flow of FIG. 9 that any one sensor of the first motor phase sensors S1 and S2 has failed. In the operation flow of FIG. 10, similarly to the operation flow of FIG. 7, the first sensor failure identification unit 540 identifies which of the first motor phase sensors S1 and S2 has failed, on the assumption that the plurality of motors M1 and M2 of the drive system 10 allow phase currents of substantially the same magnitude (amplitude) to flow (note that the phases may be shifted).

In S1000, by using the control signals SH1 and SH2, the first sensor failure identification unit 540 instructs the drive units 110-1 and 110-2 to bring the plurality of motors M1 and M2 into the winding short-circuit state. In the winding short-circuit state, the motor M1 and the motor M2 allow phase currents with a difference falling within a predetermined error range to flow, the difference being a difference in magnitude between a first current vector and a second current vector obtained by converting the respective phase currents.

In S1010, the first sensor failure identification unit 540 stands by for a predetermined period. As a result, the first sensor failure identification unit 540 waits until the phase currents of the motor M1 and the motor M2 reach the steady state in the winding short-circuit.

In S1020, the first sensor failure identification unit 540 waits until the timing at which the current flowing through the phase included in the phase pair among the plurality of second motor phases becomes 0 arrives in the winding short-circuit state of the motors M1 and M2. In the present embodiment, the first sensor failure identification unit 540 waits for the timing at which the current flowing through the W phase of the motor M2 becomes 0. Herein, since the sum of the currents flowing through the plurality of phases of the motor M2 is 0, iu2+iv2+iw2=0.

Therefore, the first sensor failure identification unit 540 can decide the timing at which the current iw2 flowing through the W phase of the motor M2 becomes 0 by waiting for the timing at which the sum of the current detection values of the second motor phase sensors S1 and S2 becomes 0 (for example, iu2+iv2=0 or iu2=−iv2). Note that the first sensor failure identification unit 540 may detect the timing at which the current iw2 flowing through the W phase of the motor M2 becomes 0 within a predetermined error range, for example, by detecting the zero-cross timing of iu2+iv2. At the timing when the current iw2 becomes 0, the current detection value iw12 of the common sensor S5 can be regarded as being equal to the current value of the W-phase current iw1 of the motor M1.

In S1030, the current vector calculation unit 510 calculates the first current vectors corresponding to the number of the first motor phase sensors S1 and S2 by using the current detection value iw12 of the common sensor S5 and the respective current detection values iu1 and iv1 of the first motor phase sensors S1 and S2 at the timing when it is determined that the current flowing through the phase included in the phase pair among the plurality of second motor phases becomes 0. In the present embodiment, the current vector calculation unit 510 calculates the magnitude |I1(iu1, iw12)| of the first current vector by using the current detection value iw12 of the common sensor S5 and the current detection value iu1 of the first motor phase sensor S1. In addition, the current vector calculation unit 510 calculates the magnitude |I1(iv1, iw12)| of the first current vector by using the current detection value iw12 of the common sensor S5 and the current detection value iv1 of the first motor phase sensor S2.

Herein, by setting iw1=iw12 and iv1=−iu1−iw12 in Expression (1), the current vector calculation unit 510 calculates the first current vector I1(iu1, iw12) without using the current detection value iv1 of the sensor S2. In addition, by setting iw1=iw12 and iu1=−iv1−iw12 in Expression (1), the current vector calculation unit 510 calculates the first current vector I1(iv1, iw12) without using the current detection value iu1 of the sensor S1. The current vector calculation unit 510 calculates the magnitudes |I1(iu1, iw12)| and |I1(iv1, iw12)| of the first current vector similarly to Expression (2).

In addition, by using the current detection values iu2 and iv2 of the second motor phase sensors S3 and S4, the current vector calculation unit 510 calculates the magnitude |I2(iu2, iv2)| of the second current vector by Expressions (3) and (4). Herein, since the second motor phase sensors S3 and S4 is normal, the magnitude |I2(iu2, iv2)| of the second current vector may include some errors, but is a correct value.

In S1040, the first sensor failure identification unit 540 decides the first current vector having the maximum difference in magnitude from the second current vector I2(iu2, iv2) among the first current vectors (I1(iu1, iw12) and I1(iv1, iw12)) calculated in S1030. In the present embodiment, in the absolute value of the difference between the magnitude |I1(iu1, iw12)| of the first current vector and the magnitude |I2(iu2, iv2)| of the second current vector and the absolute value of the difference between the magnitude |I1(iv1, iw12)| of the first current vector and the magnitude |I2(iu2, iv2)| of the second current vector, the first sensor failure identification unit 540 decides the first current vector having the maximum absolute value of the difference.

In S1050, the first sensor failure identification unit 540 identifies that the first motor phase sensor, which has output the current detection value used to calculate the first current vector having the maximum difference in magnitude from the second current vector I2(iu2, iv2) among the first current vectors (I1(iu1, iw12) and I1(iv1, iw12)), has failed. For example, in response to ∥|I1(iu1, iw12)|−|I2(iu2, iv2)|∥>∥|I1(iv1, iw12)|−|I2(iu2, iv2)|∥, the first sensor failure identification unit 540 can identify that the first motor phase sensor S1, which has output the current detection value iu1 used to calculate the first current vector I1(iu1, iw12) having the maximum difference in magnitude from the second current vector I2(iu2, iv2), has failed.

Herein, since the second current vector I2(iu2, iv2) can be regarded as correct, the magnitude of the first current vector is to be substantially the same as the magnitude of the second current vector I2(iu2, iv2) on the assumption that the plurality of motors M1 and M2 allow phase currents of the same magnitude to flow. Therefore, the first sensor failure identification unit 540 can regard, as an error, the current detection value used to calculate the first current vector having the magnitude deviating from that of the second current vector I2(iu2, iv2). The first sensor failure identification unit 540 releases the winding short-circuit state of the motors M1 and M2.

According to the first sensor failure identification unit 540 described above, which of the first motor phase sensors S1 and S2 has failed can be identified by using the current detection value of each of the sensors S1 to S5 at the timing when it is determined that the current flowing through the phase provided with the common sensor S5 in the motor M2 becomes 0 in the winding short-circuit state of the motors M1 and M2. Similarly to the first sensor failure identification unit 540, by using the operation flow similar to that in FIG. 10, the second sensor failure identification unit 550 can identify which of the second motor phase sensors S3 and S4 has failed, by using the current detection value of each of the sensors S1 to S5 at the timing when it is determined that the current flowing through the phase provided with the common sensor S5 in the motor M1 becomes 0 in the winding short-circuit state of the motors M1 and M2.

The drive control unit 120 can detect, by the failure detection unit 500, that any one of the sensors S1 to S5 has failed and identify, by the common sensor failure identification unit 520, the first sensor group failure diagnosis unit 530, the first sensor failure identification unit 540, and the second sensor failure identification unit 550, which sensor has failed. Note that the drive control unit 120 may not include all of the failure detection unit 500, the common sensor failure identification unit 520, the first sensor group failure diagnosis unit 530, the first sensor failure identification unit 540, and the second sensor failure identification unit 550. The drive control unit 120 may have an arbitrary combination of some of these, and can identify or narrow down a failed sensor within a range according to the configuration of the drive control unit 120.

Figure 11:
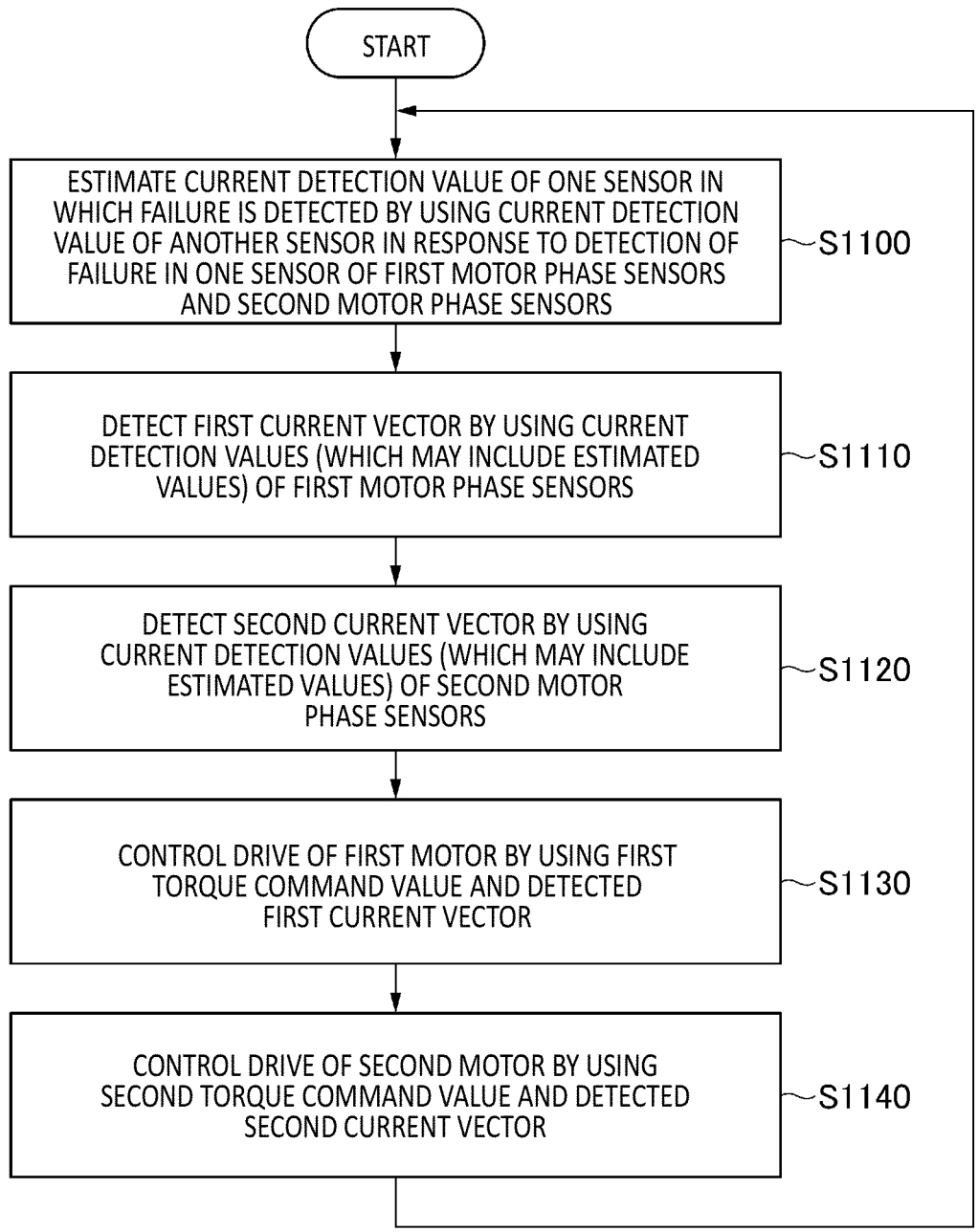
FIG. 11 illustrates an operation flow of a current vector calculation unit 510, current command calculation units 570-1 and 570-2, and current control units 580-1 and 580-2 according to the present embodiment.

FIG. 11 illustrates an operation flow of the current vector calculation unit 510, the current command calculation units 570-1 and 570-2, and the current control units 580-1 and 2 according to the present embodiment. In S1100, the current vector calculation unit 510 receives the determination result of the presence or absence of the failure of the common sensor S5 from the common sensor failure identification unit 520. The current vector calculation unit 510 receives the determination result of the presence or absence of the failure of each of the first motor phase sensors S1 and S2 from the first sensor failure identification unit 540. The current vector calculation unit 510 receives the determination result of the presence or absence of the failure of each of the second motor phase sensors S3 and S4 from the second sensor failure identification unit 550.

In response to the detection of the failure in one sensor of the first motor phase sensors S1 and S2 and the second motor phase sensors S3 and S4, by using the current detection values of the other sensors of the common sensor S5, the first motor phase sensors S1 to 2, and the second motor phase sensors S3 and S4, the current vector calculation unit 510 estimates the current detection value of the one sensor in which the failure is detected. For example, when the failure of the first motor phase sensor S1 is detected, the current vector calculation unit 510 estimates the current detection value iu1 of the sensor S1 by using the current detection value iw12 of the sensor S5, the current detection value iv1 of the sensor S2, the current detection value iu2 of the sensor S3, and the current detection value iv2 of the sensor S4.

Herein, the total current flowing into each of the motors M1 and M2 is 0, and the total current flowing into all the motors M1 and M2 is also 0 (iu1+iv1+iu2+iv2+iw12=0). Thus, iu1=−iv1−iu2−iv2−iw12. Therefore, in response to the failure in the sensor S1, the current vector calculation unit 510 can estimate the current detection value iu1 of the sensor S1 by using the current detection values iv1, iu2, iv2, and iw12 of the other sensors.

Similarly, the current vector calculation unit 510 can estimate the current detection value iv1 of the sensor S2 from iv1=−iu1−iu2−iw12, estimate the current detection value iu2 of the sensor S3 from iu2=−iv2−iu1−iv1−iw12, and estimate the current detection value iv2 of the sensor S4 from iv2=−iu2−iu1−iv1−iw12. As a result, in response to the failure in any one of the sensors S1 to S4, the current vector calculation unit 510 can estimate the current detection value of the sensor. Note that even when each of the first motor phase sensor, the second motor phase sensor, and the common sensor has an arbitrary number, similarly to the above, the current vector calculation unit 510 can estimate the current detection value of any one failed sensor among the first motor phase sensors and the second motor phase sensors.

In S1110, the current vector calculation unit 510 detects the first current vector I1 used for the drive control of the motor M1 by using the current detection values of the first motor phase sensors S1 and S2 or the estimation values (iu1 and iv1) of the current detection value and the rotation angle detection value θ1. The current vector calculation unit 510 may convert the rotation angle detection value θ1 into the electrical angle θ and calculate the first current vector I1=(I1$d$, I1$q$) by using Expression (1).

In S1120, the current vector calculation unit 510 detects the second current vector I2 used for the drive control of the motor M2 by using the current detection values (or estimation values of the current detection values) iu2 and iv2 of the second motor phase sensors S3 and S4 and the rotation angle detection value θ2. The current vector calculation unit 510 may convert the rotation angle detection value θ2 into the electrical angle θ, and calculate the second current vector I2=(I2$d$, I2$q$) by using Expression (3).

In S1130, the current command calculation unit 570-1 and the current control unit 580-1 control the drive of the motor M1 by using the first torque command value τ1 and the first current vector I1=(I1$d$, I1$q$). The current command calculation unit 570-1 generates a first current command value I1$t$=(I1$td$, I1$tq$) in a vector form from the rotation angle detection value θ1 of the motor M1 and the torque command value τ1. The current control unit 580-1 inputs the rotation angle detection value θ1 of the motor M1, the first current command value I1$t$, and the first current vector I1 which is the current detection value obtained by converting the phase current detection value of the motor M1 into the rotating coordinate system, and generates the drive signals Gu1 to Gz1 to bring the first current vector I1 close to (or match) the current command value I1$t$.

In S1140, the current command calculation unit 570-2 and the current control unit 580-2 control the drive of the motor M2 by using the second torque command value τ2 and the second current vector I2=(I2$d$, I2$q$). The current command calculation unit 570-2 generates a second current command value I2$t$=(I2$td$, I2$tq$) in a vector form from the rotation angle detection value θ2 of the motor M2 and the torque command value τ2. The current control unit 580-2 inputs the rotation angle detection value θ2 of the motor M2, the second current command value I2$t$, and the second current vector I2 which is the current detection value obtained by converting the phase current detection value of the motor M2 into the rotating coordinate system, and generates the drive signals Gu2 to Gz2 to bring the second current vector I2 close to (or match) the current command value I2$t$.

As a result, by using the estimation result of the current detection value of the sensor, in which the failure is detected, among the first motor phase sensors S1 and S2 and the second motor phase sensors S3 and S4, the drive control unit 120 can control the drive amounts of the plurality of drive units 110-1 and 110-2 for the plurality of first motor phases and the plurality of second motor phases of the plurality of motors M1 and M2. Therefore, even when any one of the plurality of sensors S1 to S5 has failed, the drive control unit 120 can continue driving the plurality of motors M1 and M2.

Note that the drive control unit 120 may not have a function of identifying which of the plurality of sensors S1 to S5 has failed. In this case, the drive control unit 120 may receive the specification of the failed sensor from the user or another device, estimate the current detection value of the failed sensor, and control the drive amount of the plurality of motors by using the estimated current detection value.

Figure 12:
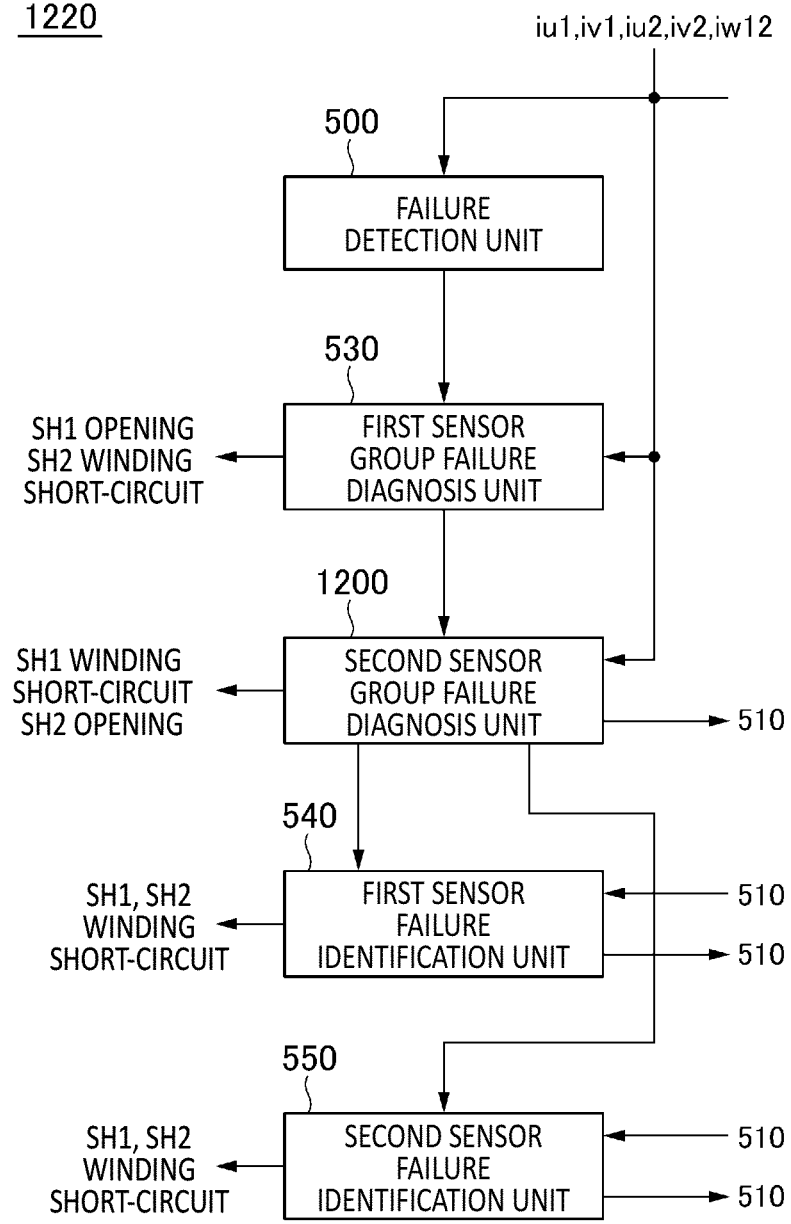
FIG. 12 illustrates a partial configuration of a drive control unit 1220 according to a modification of the present embodiment.

FIG. 12 illustrates a partial configuration of the drive control unit 1220 according to a modification of the present embodiment. The drive control unit 1220 does not include the common sensor failure identification unit 520 but includes a second sensor group failure diagnosis unit 1200 in the drive control unit 120 of FIG. 5. The drive control unit 1220 detects the presence or absence of the failure of the common sensor S5 on the basis of the diagnosis results of the first sensor group failure diagnosis unit 530 and the second sensor group failure diagnosis unit 1200. In this figure, the illustration of the current vector calculation unit 510, the current command calculation units 570-1 and 570-2, and the current control units 580-1 and 2 is omitted. In addition, in the drive control unit 1220, constituent members having the functions and configurations similar to those of the drive control unit 120 are denoted by the same reference numerals as those in FIG. 5, and description thereof is omitted except for differences.

The first sensor group failure diagnosis unit 530 is similar to the first sensor group failure diagnosis unit 530 in FIG. 5. In the present embodiment, the drive control unit 1220 does not include the common sensor failure identification unit 520, and thus in response to the detection of the failure in any sensor by the failure detection unit 500, the first sensor group failure diagnosis unit 530 executes the operation flow of FIG. 9 in a state where the presence or absence of the failure of the common sensor S5 is uncertain. As a result, in a state where the plurality of first motor phases of the motor M1 are opened, in response to the total current amount of flowing into the motor M2 being substantially 0 (outside a predetermined error range from 0) ("Y" in S920), the first sensor group failure diagnosis unit 530 diagnoses that the second motor phase sensors S3 and S4 and the common sensor S5 are normal (S930). In a state where the plurality of first motor phases of the motor M1 are opened, in response to the total current amount of flowing into the motor M2 not being substantially 0 (outside the predetermined error range from 0) ("Y" in S920), the first sensor group failure diagnosis unit 530 diagnoses that any one of the second motor phase sensors S3 and S4 and the common sensor S5 has failed (S930).

Similarly to the first sensor group failure diagnosis unit 530, the second sensor group failure diagnosis unit 1200 brings the motor M1 into the winding short-circuit state, and in a state where the plurality of second motor phases of the motor M2 are opened, in response to the total current amount of flowing into the motor M1 being substantially 0 (within the predetermined error range from 0), the second sensor group failure diagnosis unit diagnoses that the first motor phase sensors S1 and S2 and the common sensor S5 are normal. In a state where the plurality of second motor phases of the motor M2 are opened, in response to the total current amount of flowing into the motor M1 not being substantially 0 (outside the predetermined error range from 0), the second sensor group failure diagnosis unit 1200 diagnoses that any one of the first motor phase sensors S1 and S2 and the common sensor S5 has failed.

When it is diagnosed that the second motor phase sensors S3 and S4 and the common sensor S5 are normal and it is diagnosed that any one of the first motor phase sensors S1 and S2 and the common sensor S5 has failed, the current vector calculation unit 510, the first sensor failure identification unit 540, and the second sensor failure identification unit 550 in the drive control unit 120 can determine that any one of the first motor phase sensors S1 and S2 has failed. In addition, when it is diagnosed that any one of the second motor phase sensors S3 and S4 and the common sensor S5 has failed and any one of the first motor phase sensors S1 and S2 and the common sensor S5 has failed, the current vector calculation unit 510, the first sensor failure identification unit 540, and the second sensor failure identification unit 550 in the drive control unit 120 can determine that the common sensor S5 has failed. In addition, when it is diagnosed that any one of the second motor phase sensors S3 and S4 and the common sensor S5 has failed and the first motor phase sensors S1 and S2 and the common sensor S5 are normal, the current vector calculation unit 510, the first sensor failure identification unit 540, and the second sensor failure identification unit 550 in the drive control unit 120 can determine that any one of the second motor phase sensors S3 and S4 has failed.

According to the second sensor group failure diagnosis unit 1200 described above, it is possible to determine the presence or absence of the failure of the common sensor S5 without including the common sensor failure identification unit 520 illustrated in FIG. 5. Therefore, in the drive system 10 including the second sensor group failure diagnosis unit 1200, without the assumption that the plurality of motors M1 and M2 allow phase currents of substantially the same magnitude (amplitude) to flow, the presence or absence of the failure of the common sensor S5 can be determined, for example, even when the plurality of motors M1 and M2 independently drive different shafts.

Various embodiments of the present invention may be described with reference to flowcharts and block diagrams, whose blocks may represent (1) steps of processes in which operations are executed or (2) sections of apparatuses responsible for executing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits, and may include integrated circuits (IC) and/or discrete circuits. The programmable circuit may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

A computer-readable medium may include any tangible device that can store instructions to be executed by a suitable device, and as a result, the computer-readable medium having instructions stored thereon includes an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general purpose computer, special purpose computer, or other programmable data processing apparatuses, or to a programmable circuit, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 13:
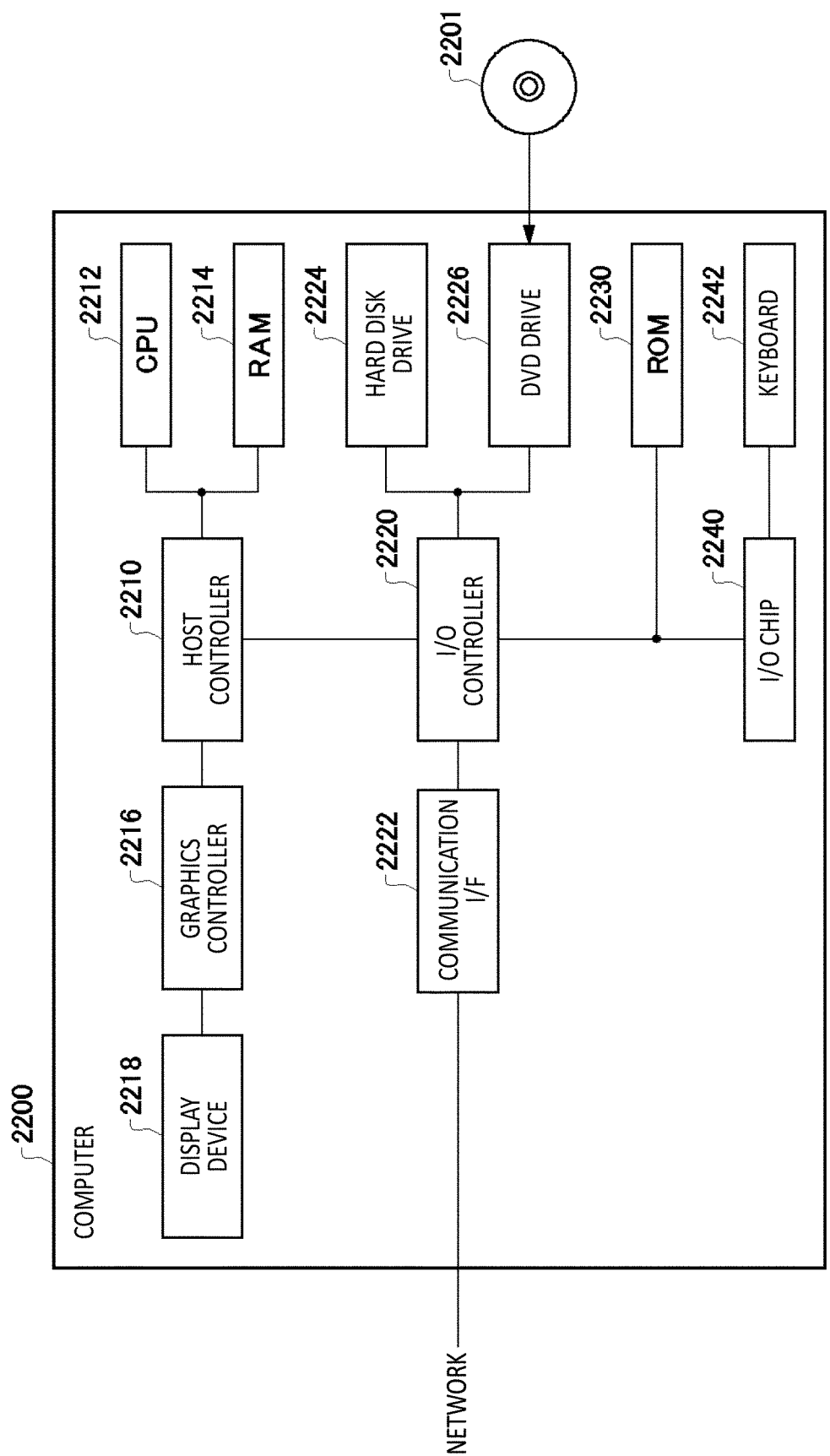
FIG. 13 illustrates an example of a computer 2200 in which a plurality of aspects of the present invention may be embodied in whole or in part.

FIG. 13 illustrates an example of a computer 2200 in which a plurality of aspects of the present invention may be embodied in whole or in part. A program installed in the computer 2200 may cause the computer 2200 to function as an operation associated with the apparatuses according to the embodiments of the present invention or as one or more sections of the apparatuses, or may cause the operation or the one or more sections to be executed, and/or may cause the computer 2200 to execute a process according to the embodiments of the present invention or a stage of the process. Such programs may be executed by a CPU 2212 to cause the computer 2200 to perform certain operations associated with some or all of the blocks in the flowcharts and block diagrams described in the present specification.

The computer 2200 according to the present embodiment includes the CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 in the computer 2200. The DVD-ROM drive 2226 reads the programs or the data from the DVD-ROM 2201, and provides the hard disk drive 2224 with the programs or the data via the RAM 2214. The IC card drive reads the programs and the data from the IC card, and/or writes the programs and the data to the IC card.

The ROM 2230 stores therein boot programs and the like executed by the computer 2200 at the time of activation, and/or programs that depend on the hardware of the computer 2200. The input/output chip 2240 may also connect various input/output units to the input/output controller 2220 via a parallel port, a serial port, a keyboard port, a mouse port, and the like.

The program is provided by a computer-readable medium such as the DVD-ROM 2201 or the IC card. The program is read from a computer-readable medium, installed in the hard disk drive 2224, the RAM 2214, or the ROM 2230 which are also examples of the computer-readable medium, and executed by the CPU 2212. The information processing described in these programs is read by the computer 2200 and provides cooperation between the programs and various types of hardware resources. The apparatus or method may be configured by implementing operations or processing of information according to use of the computer 2200.

For example, in a case where communication is performed between the computer 2200 and an external device, the CPU 2212 may execute a communication program loaded in the RAM 2214 and instruct the communication interface 2222 to perform communication processing on the basis of processing described in the communication program. Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause the RAM 2214 to read all or a necessary part of a file or database stored in an external recording medium such as the hard disk drive 2224, the DVD-ROM drive 2226 (DVD-ROM 2201), the IC card, or the like, and may execute various types of processing on data on the RAM 2214. Next, the CPU 2212 writes back the processed data to the external recording medium.

Various types of information such as various types of programs, data, tables, and databases may be stored in a recording medium and subjected to information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The programs or software modules described above may be stored in a computer-readable medium on or near the computer 2200. In addition, a recording medium such as a hard disk or a RAM provided in a server system connected to a dedicated communication network or the Internet can be used as a computer-readable medium, thereby providing a program to the computer 2200 via the network.

While the embodiments of the present invention have been described, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES 10 drive system
100 motor drive device
110-1 to 110-2 drive unit
120 drive control unit
200-1 to 200-2 short-circuit control unit
210-1 to 210-2 gate driver
300 conductor
310 magnetic core
320 magnetic sensor
400 first conductor
405 second conductor
410 magnetic core
420 magnetic sensor
500 failure detection unit
510 current vector calculation unit
520 common sensor failure identification unit
530 first sensor group failure diagnosis unit
540 first sensor failure identification unit
550 second sensor failure identification unit
570-1 to 570-2 current command calculation unit
580-1 to 580-2 current control unit
1200 second sensor group failure diagnosis unit
1220 drive control unit
2200 computer
2201 DVD-ROM
2210 host controller
2212 CPU
2214 RAM
2216 graphic controller
2218 display device
2220 input/output controller
2222 communication interface
2224 hard disk drive 2226 DVD-ROM drive
2230 ROM
2240 input/output chip
2242 keyboard.

What is claimed is:

1. A motor drive device comprising:
a first drive unit configured to drive a plurality of first motor phases included in a first motor;
a second drive unit configured to drive a plurality of second motor phases included in a second motor;
a common sensor configured to detect a total current flowing through a phase pair obtained by selecting one phase from the plurality of first motor phases and one phase from the plurality of second motor phases;
at least one first motor phase sensor configured to detect each current flowing through each phase not included in the phase pair among the plurality of first motor phases;
at least one second motor phase sensor configured to detect each current flowing through each phase not included in the phase pair among the plurality of second motor phases; and
a drive control unit configured to control drive amounts of the first drive unit and the second drive unit for the plurality of first motor phases and the plurality of second motor phases by using respective current detection values of the common sensor, the at least one first motor phase sensor, and the at least one second motor phase sensor, wherein
the drive control unit includes a failure detection unit configured to detect a failure of any sensor in response to a total current amount of flowing into the first motor and the second motor being outside a predetermined error range from 0, the total current amount being calculated by using respective current detection values of the common sensor, the at least one first motor phase sensor, and the at least one second motor phase sensor, wherein
in a winding short-circuit state, the first motor and the second motor allow respective phase currents with a difference falling within a predetermined error range to flow, the difference being a difference in magnitude between a first current vector and a second current vector obtained by converting respective phase currents, and
the drive control unit includes a common sensor failure identification unit configured to identify a failure of the common sensor in response to a fact that it is detected that the any sensor of the common sensor, the at least one first motor phase sensor, and the at least one second motor phase sensor has failed, and the difference in magnitude between the first current vector calculated by using a current detection value of the at least one first motor phase sensor and the second current vector calculated by using a current detection value of the at least one second motor phase sensor is within the predetermined error range in a winding short-circuit state of the first motor and the second motor.

2. The motor drive device according to claim 1, wherein
in response to detection of a failure in one sensor of the at least one first motor phase sensor and the at least one second motor phase sensor, the drive control unit is configured to control the drive amounts of the first drive unit and the second drive unit for the plurality of first motor phases and the plurality of second motor phases by using a result obtained when a current detection value of the one sensor in which the failure is detected is estimated by using a current detection value of another sensor among the common sensor, the at least one first motor phase sensor, and the at least one second motor phase sensor.

3. The motor drive device according to claim 2, wherein
the drive control unit includes a first sensor group failure diagnosis unit configured to diagnose that the at least one second motor phase sensor is normal in response to a total current amount of flowing into the second motor being within a predetermined error range from 0 in a state where the plurality of first motor phases of the first motor are opened, the total current amount being calculated by using respective current detection values of the common sensor and the at least one second motor phase sensor.

4. The motor drive device according to claim 2, wherein
in a winding short-circuit state, the first motor and the second motor allow phase currents with a difference falling within a predetermined error range to flow, the difference being a difference in magnitude between a first current vector and a second current vector obtained by converting respective phase currents, and
the drive control unit includes:
a current vector calculation unit configured to calculate, in response to diagnosis that any sensor of the at least one first motor phase sensor has failed, at least one of the first current vector by using a current detection value of the common sensor and a current detection value of each of the at least one first motor phase sensor at a timing when it is determined that a current flowing through a phase included in the phase pair among the plurality of second motor phases becomes 0 in a winding short-circuit state of the first motor and the second motor; and
a first sensor failure identification unit configured to identify that a first motor phase sensor that has output a current detection value used for calculation of the first current vector among the at least one of the first current vector has failed, the first current vector having a maximum difference in magnitude from the second current vector calculated by using the current detection value of the at least one second motor phase sensor.

5. The motor drive device according to claim 2, wherein
the plurality of first motor phases are three first motor phases,
the plurality of second motor phases are three second motor phases,
a number of the common sensors is one,
the at least one first motor phase sensor is two first motor phase sensors, and
the at least one second motor phase sensor is two second motor phase sensors.

6. The motor drive device according to claim 1, wherein
the drive control unit includes a first sensor group failure diagnosis unit configured to diagnose that the at least one second motor phase sensor is normal in response to a total current amount of flowing into the second motor being within a predetermined error range from 0 in a state where the plurality of first motor phases of the first motor are opened, the total current amount being calculated by using respective current detection values of the common sensor and the at least one second motor phase sensor.

7. The motor drive device according to claim 6, wherein
the drive control unit includes a second sensor group failure diagnosis unit configured to diagnose that the at least one first motor phase sensor is normal in response to a total current amount of flowing into the second motor being within a predetermined error range from 0 in a state where the plurality of second motor phases of the second motor are opened, the total current amount being calculated by using respective current detection values of the common sensor and the at least one first motor phase sensor.

8. The motor drive device according to claim 1, wherein the plurality of first motor phases are three first motor phases,
the plurality of second motor phases are three second motor phases,
a number of the common sensors is one,
the at least one first motor phase sensor is two first motor phase sensors, and
the at least one second motor phase sensor is two second motor phase sensors.

9. A motor drive device comprising:
a first drive unit configured to drive a plurality of first motor phases included in a first motor;
a second drive unit configured to drive a plurality of second motor phases included in a second motor;
a common sensor configured to detect a total current flowing through a phase pair obtained by selecting one phase from the plurality of first motor phases and one phase from the plurality of second motor phases;
at least one first motor phase sensor configured to detect each current flowing through each phase not included in the phase pair among the plurality of first motor phases;
at least one second motor phase sensor configured to detect each current flowing through each phase not included in the phase pair among the plurality of second motor phases; and
a drive control unit configured to control drive amounts of the first drive unit and the second drive unit for the plurality of first motor phases and the plurality of second motor phases by using respective current detection values of the common sensor, the at least one first motor phase sensor, and the at least one second motor phase sensor, wherein
in a winding short-circuit state, the first motor and the second motor allow phase currents with a difference falling within a predetermined error range to flow, the difference being a difference in magnitude between a first current vector and a second current vector obtained by converting respective phase currents, and
the drive control unit includes:
a current vector calculation unit configured to calculate, in response to diagnosis that any sensor of the at least one first motor phase sensor has failed, at least one of the first current vector by using a current detection value of the common sensor and a current detection value of each of the at least one first motor phase sensor at a timing when it is determined that a current flowing through a phase included in the phase pair among the plurality of second motor phases becomes 0 in a winding short-circuit state of the first motor and the second motor; and a first sensor failure identification unit configured to identify that a first motor phase sensor that has output a current detection value used for calculation of the first current vector among the at least one of the first current vector has failed, the first current vector having a maximum difference in magnitude from the second current vector calculated by using the current detection value of the at least one second motor phase sensor.

10. A non-transitory computer readable medium having recorded thereon a motor drive program that, when executed by a computer, causes the computer to function as:
a first drive unit configured to drive a plurality of first motor phases included in a first motor;
a second drive unit configured to drive a plurality of second motor phases included in a second motor;
a drive control unit configured to control drive amounts of the first drive unit and the second drive unit for the plurality of first motor phases and the plurality of second motor phases by using respective current detection values of a common sensor configured to detect a total current flowing through a phase pair obtained by selecting one phase from the plurality of first motor phases and one phase from the plurality of second motor phases, at least one first motor phase sensor configured to detect each current flowing through each phase not included in the phase pair among the plurality of first motor phases, and at least one second motor phase sensor configured to detect each current flowing through each phase not included in the phase pair among the plurality of second motor phases, wherein
the drive control unit includes a failure detection unit configured to detect a failure of any sensor in response to a total current amount of flowing into the first motor and the second motor being outside a predetermined error range from 0, the total current amount being calculated by using respective current detection values of the common sensor, the at least one first motor phase sensor, and the at least one second motor phase sensor, wherein
in a winding short-circuit state, the first motor and the second motor allow respective phase currents with a difference falling within a predetermined error range to flow, the difference being a difference in magnitude between a first current vector and a second current vector obtained by converting respective phase currents, and
the drive control unit includes a common sensor failure identification unit configured to identify a failure of the common sensor in response to a fact that it is detected that the any sensor of the common sensor, the at least one first motor phase sensor, and the at least one second motor phase sensor has failed, and the difference in magnitude between the first current vector calculated by using a current detection value of the at least one first motor phase sensor and the second current vector calculated by using a current detection value of the at least one second motor phase sensor is within the predetermined error range in a winding short-circuit state of the first motor and the second motor.

* * * * *